US011352968B1

(12) United States Patent
Kiwan et al.

(10) Patent No.: US 11,352,968 B1
(45) Date of Patent: Jun. 7, 2022

(54) METHODS AND SYSTEMS FOR REDUCING CATALYST COOLING DURING FUEL CUT VIA PRE-CHAMBER IGNITION SYSTEM

(71) Applicant: Ford Global Technologies, LLC, Dearborn, MI (US)

(72) Inventors: Rani Kiwan, Canton, MI (US); Chris Glugla, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/305,023

(22) Filed: Jun. 29, 2021

(51) Int. Cl.
*F02D 41/00* (2006.01)
*F02B 19/12* (2006.01)
(Continued)

(52) U.S. Cl.
CPC ........ *F02D 41/0087* (2013.01); *F02B 19/108* (2013.01); *F02B 19/1085* (2013.01); *F02B 19/12* (2013.01); *F02D 13/0249* (2013.01); *F02D 41/0027* (2013.01); *F02D 41/0235* (2013.01); *F02D 41/123* (2013.01); *F02D 41/1446* (2013.01); *F02D 41/1454* (2013.01); *F02D 41/401* (2013.01); *F02D 2041/0265* (2013.01); *F02D 2200/0802* (2013.01); *F02D 2200/602* (2013.01)

(58) Field of Classification Search
CPC .... F02B 19/10; F02B 19/1023; F02B 19/108; F02B 19/10885; F02B 19/12; F02D 41/0027; F02D 41/0087; F02D 41/123; F02D 41/3094; F02D 2200/0802; F02D 2200/0804
See application file for complete search history.

(56) References Cited

U.S. PATENT DOCUMENTS

| 2,884,913 A | * | 5/1959 | Heintz | F02D 9/00 |
| | | | | 123/275 |
| 3,019,777 A | * | 2/1962 | Candelise | F02B 47/00 |
| | | | | 123/26 |

(Continued)

FOREIGN PATENT DOCUMENTS

| DE | 19514500 A1 | 10/1996 |
| DE | 102017009613 A1 * | 4/2018 |

(Continued)

OTHER PUBLICATIONS

Kiwan, R. et al., "System and Method for Operating an Engine in a Fuel Cut-Out Mode," U.S. Appl. No. 16/839,405, filed Apr. 3, 2020, 31 pages.

*Primary Examiner* — John M Zaleskas
(74) *Attorney, Agent, or Firm* — Geoffrey Brumbaugh; McCoy Russell LLP

(57) ABSTRACT

Methods and systems are provided for transferring hot, compressed gases from one cylinder to another cylinder while fuel injection in both cylinders is deactivated. In one example, a method may include during a fuel shut-off event, opening a first pre-chamber injector of the first cylinder undergoing late compression or early expansion and opening a second pre-chamber injector of the second cylinder undergoing a late expansion and/or exhaust stroke or undergoing an intake stroke to allow a hot, compressed gas from the first cylinder to transfer to the second cylinder through the first and second pre-chamber injectors.

20 Claims, 10 Drawing Sheets

(51) Int. Cl.
  *F02B 19/10* (2006.01)
  *F02D 41/02* (2006.01)
  *F02D 41/14* (2006.01)
  *F02D 13/02* (2006.01)
  *F02D 41/40* (2006.01)
  *F02D 41/12* (2006.01)

(56) References Cited

U.S. PATENT DOCUMENTS

| | | | | |
|---|---|---|---|---|
| 3,824,965 | A * | 7/1974 | Clawson | F02B 19/1085 123/275 |
| 3,980,058 | A * | 9/1976 | Nakagawa | F02B 19/1057 123/275 |
| 3,983,847 | A * | 10/1976 | Wyczalek | F02B 19/1085 123/270 |
| 4,004,554 | A * | 1/1977 | Kosaka | F02B 43/10 123/3 |
| 4,071,013 | A * | 1/1978 | Thuren | F02B 19/1085 123/277 |
| 4,109,625 | A * | 8/1978 | Kawamura | F02M 26/20 123/275 |
| 4,140,090 | A * | 2/1979 | Lindberg | F02B 19/108 123/3 |
| 4,156,414 | A * | 5/1979 | Kawamura | F02D 13/0276 123/275 |
| 4,638,777 | A * | 1/1987 | Fanner | F02D 19/022 123/527 |
| 5,081,969 | A * | 1/1992 | Long, III | F02B 19/1057 123/274 |
| 5,115,790 | A * | 5/1992 | Kawamura | F02M 26/42 123/568.26 |
| 6,298,825 | B1 * | 10/2001 | Hupperich | F02D 41/3047 123/145 A |
| 6,427,660 | B1 * | 8/2002 | Yang | F02D 19/0647 123/304 |
| 7,159,551 | B2 | 1/2007 | Cecur et al. | |
| 7,404,383 | B2 | 7/2008 | Elendt | |
| 8,925,518 | B1 * | 1/2015 | Riley | F02D 41/0027 123/304 |
| 9,605,603 | B2 | 3/2017 | Glugla et al. | |
| 10,125,700 | B2 | 11/2018 | Antcliff et al. | |
| 10,132,235 | B2 | 11/2018 | Ulrey et al. | |
| 10,190,507 | B2 | 1/2019 | Ulrey et al. | |
| 10,330,001 | B2 | 6/2019 | Leone et al. | |
| 11,060,443 | B1 * | 7/2021 | Thomas | F02D 41/3005 |
| 11,105,287 | B1 * | 8/2021 | Glugla | F02D 41/0002 |
| 2009/0241896 | A1 * | 10/2009 | Fiveland | F02B 7/06 123/179.5 |
| 2011/0308495 | A1 * | 12/2011 | Furukawa | F02D 41/0027 123/253 |
| 2012/0118262 | A1 * | 5/2012 | Johnson | F02B 25/14 123/260 |
| 2012/0310510 | A1 * | 12/2012 | Imamura | F02D 41/1497 701/104 |
| 2013/0000598 | A1 * | 1/2013 | Tokuoka | F02B 19/18 123/254 |
| 2014/0083391 | A1 * | 3/2014 | Gruber | F02B 19/12 123/260 |
| 2014/0196686 | A1 * | 7/2014 | Coldren | F02M 21/0245 123/299 |
| 2015/0260131 | A1 * | 9/2015 | Riley | B01D 53/002 123/542 |
| 2015/0267631 | A1 * | 9/2015 | Miyamoto | F02M 21/0284 123/445 |
| 2015/0354481 | A1 * | 12/2015 | Geckler | F02B 19/108 123/274 |
| 2016/0230645 | A1 * | 8/2016 | Schock | F02B 19/1052 |
| 2017/0321617 | A1 | 11/2017 | Kalluri et al. | |
| 2018/0003132 | A1 * | 1/2018 | Ginter | F02M 27/04 |
| 2018/0038269 | A1 * | 2/2018 | Willi | F02D 41/3005 |
| 2020/0158005 | A1 * | 5/2020 | Singh | F02M 25/08 |
| 2020/0200068 | A1 * | 6/2020 | Schock | F02B 19/18 |
| 2021/0207551 | A1 * | 7/2021 | Glugla | F02D 41/008 |
| 2021/0246823 | A1 * | 8/2021 | Glugla | F02D 41/068 |
| 2021/0262408 | A1 * | 8/2021 | Glugla | F02B 1/06 |
| 2021/0310402 | A1 * | 10/2021 | Glugla | F02B 19/1052 |
| 2021/0310429 | A1 * | 10/2021 | Kiwan | F02D 13/06 |
| 2021/0324784 | A1 * | 10/2021 | De Cesare | F02B 19/109 |

FOREIGN PATENT DOCUMENTS

| | | | | |
|---|---|---|---|---|
| DE | 102015221286 B4 * | 8/2020 | | F02B 19/1023 |
| DE | 102019114204 A1 * | 12/2020 | | |
| EP | 2067954 A1 * | 6/2009 | | F02B 19/1052 |
| EP | 2495419 A1 | 9/2012 | | |
| FR | 3100580 A1 * | 3/2021 | | |
| GB | 2073317 A * | 10/1981 | | F02B 19/10 |
| JP | 2010209908 A * | 9/2010 | | F02B 19/108 |
| JP | 2019044670 A | 3/2019 | | |
| WO | WO-0155568 A2 * | 8/2001 | | F02B 19/02 |
| WO | WO-2015138987 A1 * | 9/2015 | | F02B 19/12 |

* cited by examiner

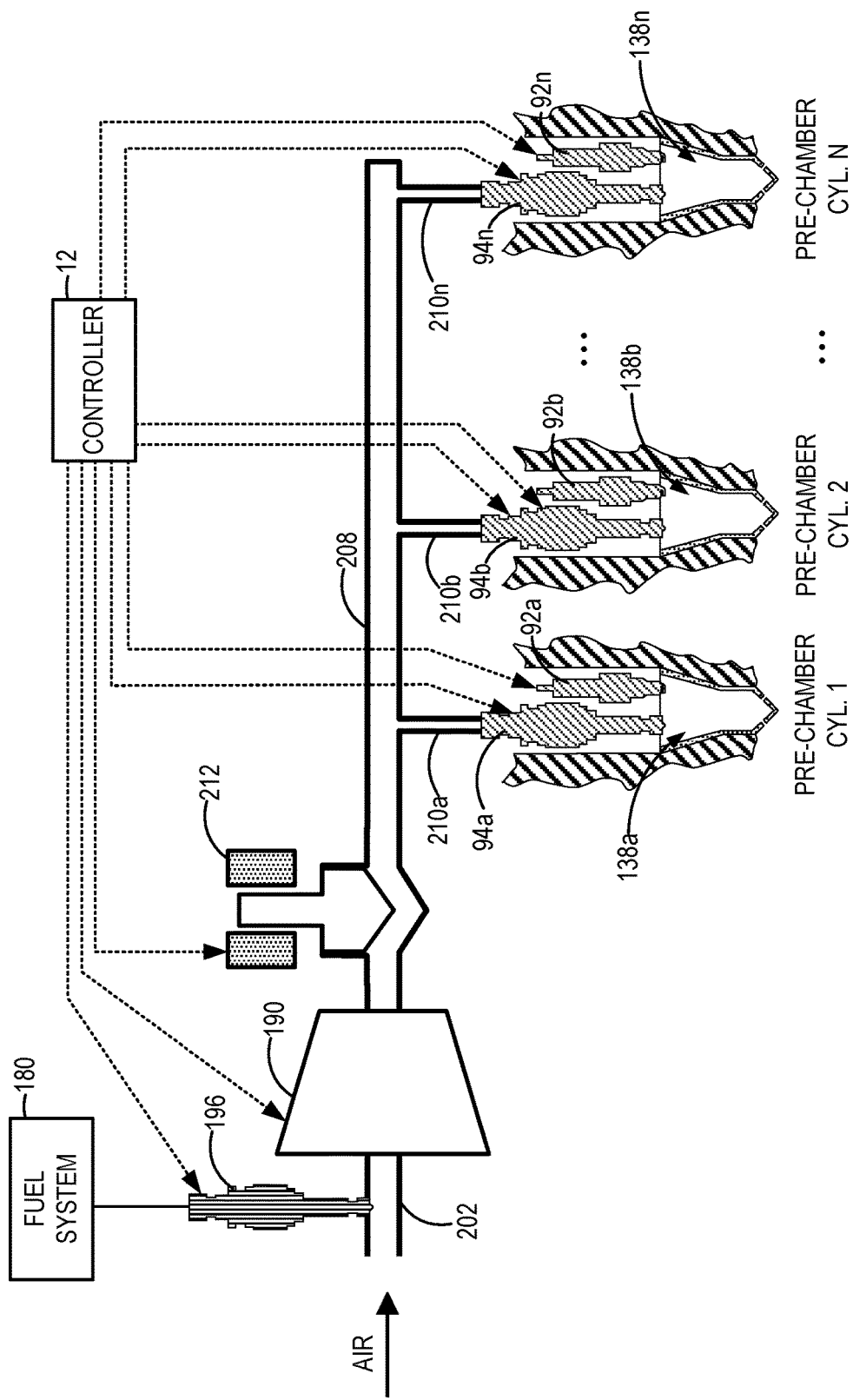

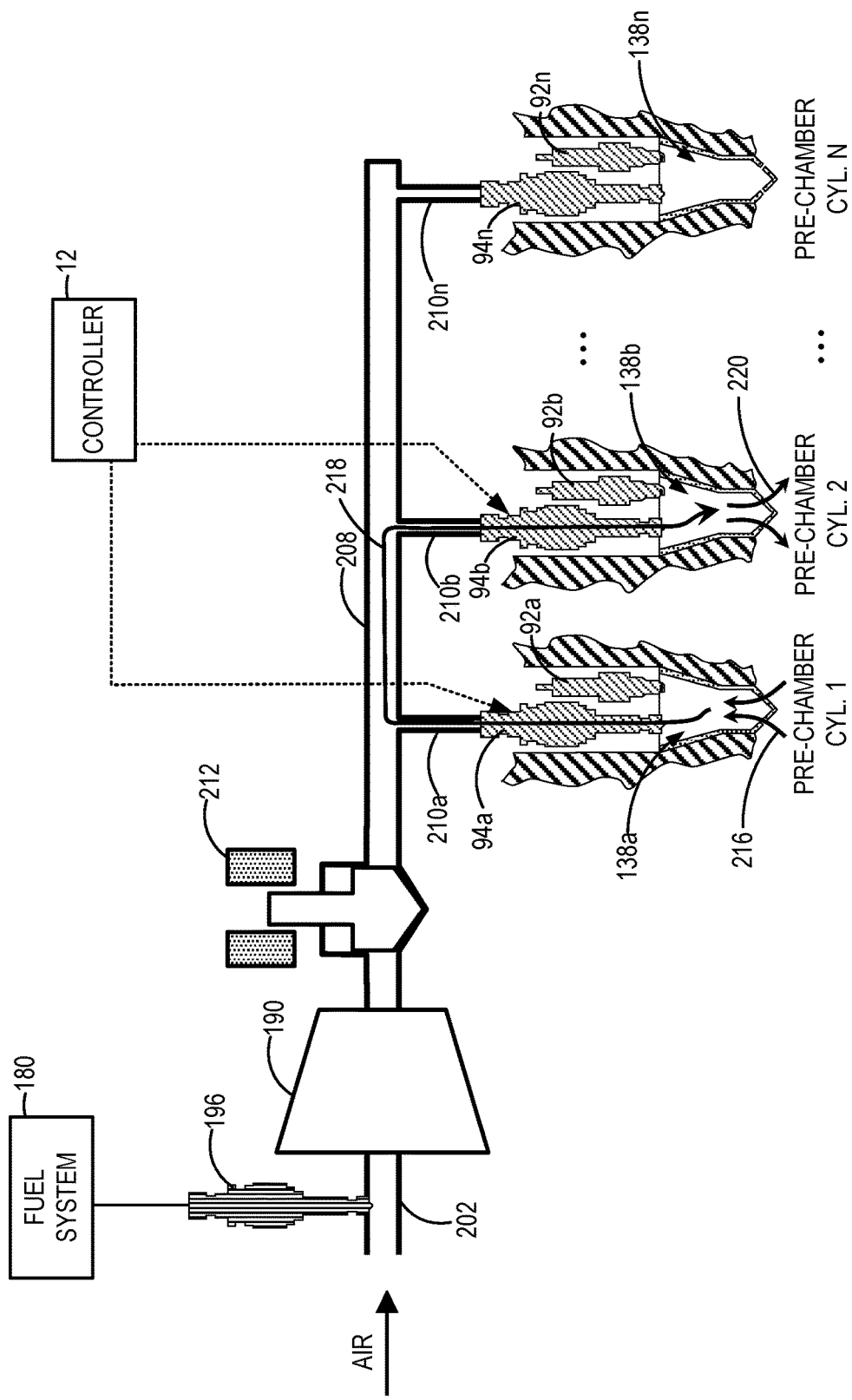

METHODS AND SYSTEMS FOR REDUCING CATALYST COOLING DURING FUEL CUT VIA PRE-CHAMBER IGNITION SYSTEM

FIELD

The present description relates generally to methods and systems for a pre-chamber ignition system for an internal combustion engine.

BACKGROUND/SUMMARY

An emission control device, such as a catalytic converter (also referred to herein as a "catalyst"), is included in an exhaust system of a vehicle to treat gas components exhausted from an engine prior to emission from the vehicle via a tail pipe. For example, the emission control device may be a three-way catalyst that oxidizes hydrocarbons and carbon monoxide and reduces nitrogen oxides. However, the three-way catalyst achieves higher emission reduction while operating above a predetermined temperature (e.g., a light-off temperature). Thus, undesirable vehicle emissions may occur during conditions that lower a temperature of the three-way catalyst below the predetermined temperature. For example, the temperature of the three-way catalyst may decrease during fuel shut-off conditions where combustion is temporarily discontinued responsive to a decreased torque demand while a speed of the vehicle is above a threshold speed. Operating the engine in the fuel shut-off mode may reduce fuel consumption since fuel is not consumed by the engine to sustain engine rotation, but increased emissions may occur when combustion is resumed due to the decreased temperature of the three-way catalyst.

Further, while combustion is discontinued, air may continue to flow through the engine, which may disturb a balance of oxidants and reductants in the three-way catalyst. As a result, the emission of nitrogen oxides may be further increased upon exit from the fuel shut-off. Further still, the engine may be operated with rich fueling upon exit from the fuel shut-off to restore the balance of oxidants and reductants in the three-way catalyst, which reduces a fuel economy benefit from operating the engine in the fuel shut-off mode.

The inventors herein have advantageously recognized that some vehicle systems include components that may be leveraged to transfer hot, compressed gas (e.g., air) between cylinders. In particular, an engine may be equipped with a turbulent jet ignition (TJI) system that ignites an air-fuel mixture within a cylinder via combustion in a pre-combustion chamber, referred to herein as a "pre-chamber." The pre-chamber may be a walled chamber located in a clearance volume of the cylinder (also referred to herein as a "main chamber" or "main combustion chamber") and may include a spark plug. High pressure air and fuel are introduced into the pre-chamber via an injector of the TJI system, and when ignition is requested, the spark plug in the pre-chamber is actuated, igniting the air and fuel in the pre-chamber. Jets of flame and hot gas exit the pre-chamber and enter the cylinder via one or more small orifices in the pre-chamber walls. These jets ignite the air-fuel mixture in the cylinder to produce torque. As such, the inventors herein have identified that instead of opening the injector to supply air and fuel, during a fuel shut-off, the injector may instead be opened during compression, and the compressed gas may flow from the pre-chamber into the injector. Thus, each cylinder may be used as a source of hot, compressed gas to supply to other cylinders of the engine.

In one example, the issues described above may be addressed by a method for an engine, comprising: during deactivated direct injection to a first and second cylinders of the engine, opening a first pre-chamber injector of the first cylinder undergoing late compression and/or early expansion and opening a second pre-chamber injector of the second cylinder undergoing late expansion or exhaust stroke to allow a hot compressed gas from the first cylinder to transfer to the second cylinder through a rail coupling the first and second pre-chamber injectors. In this way, by transferring hot, compressed gases between cylinders, a temperature of exhaust gases increases such that a temperature of a catalyst may not decrease below an efficient temperature (e.g., a light-off temperature of the catalyst).

As one example, the first pre-chamber injector and the second pre-chamber injector may be open simultaneously or sequentially. The first and second pre-chamber injectors may open at the same (or nearly the same time), for example. As another example, the first pre-chamber injector may open before the second pre-chamber injector and the opening of the second pre-chamber injector may partially overlap with the time the first pre-chamber injector is open. In other examples, the first pre-chamber injector may open and close before the second pre-chamber injector opens. In this way, if a first cylinder undergoing the late compression and/or early expansion stroke does not overlap in time with a second cylinder in the late expansion and/or exhaust stroke, the hot, compressed gas may still be transferred between cylinders. Furthermore, this method of recirculating gases increases a fuel economy of the vehicle by not having to operate an engine rich (e.g., reducing a desire for fuel enrichment) out of a fuel shut-off to rebalance an oxygen saturated catalyst, and the catalyst may be maintained above a light-off temperature so that once combustion is resumed, emissions from the engine may be efficiently treated.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2A shows a schematic depiction of an exemplary turbulent jet ignition system.

FIG. 2C shows a schematic depiction of the exemplary turbulent jet ignition system in a second operating mode.

DETAILED DESCRIPTION

Figure 7:
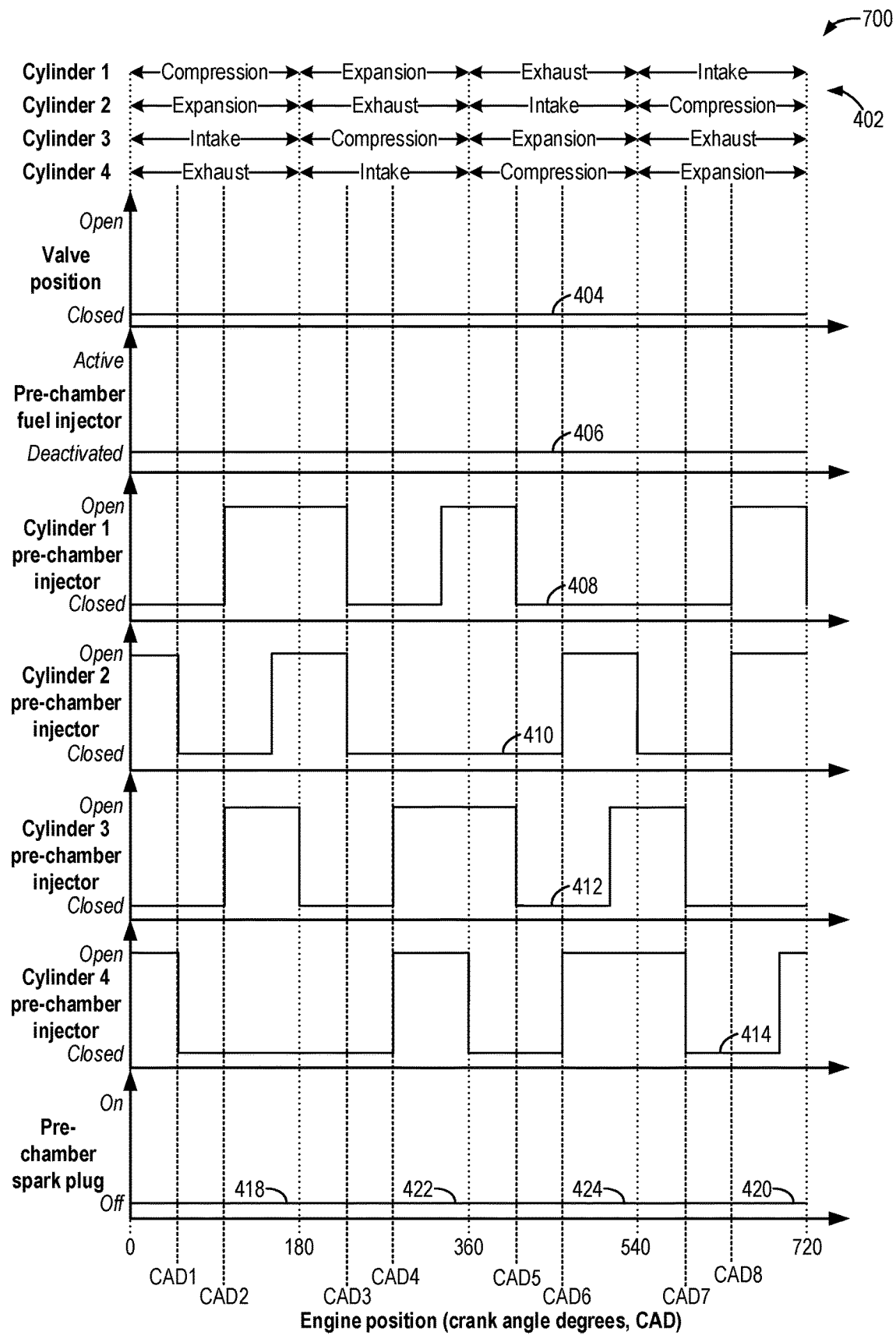
FIG. 7 shows a third example timing chart of operating a turbulent jet ignition system in a gas transfer mode.
Figure 8:
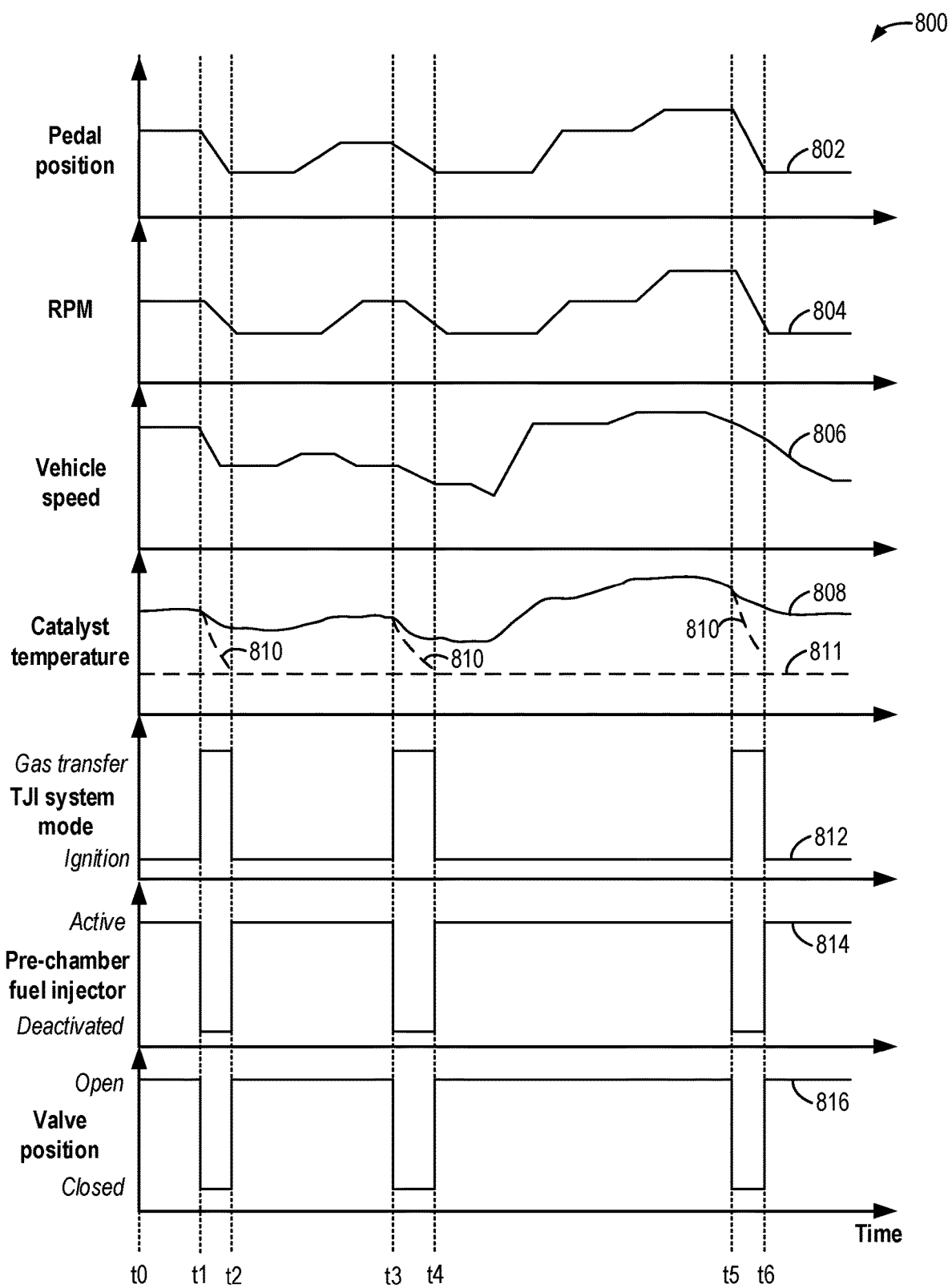
FIG. 8 shows an example timeline for adjusting operation of a TJI system.

The following description relates to systems and methods for reducing exhaust emissions following a fuel shut-off condition. The engine may be the engine schematically shown in FIG. 1, for example, including a turbulent jet ignition (TJI) system with a pre-chamber coupled to each cylinder of the engine. In some examples, the TJI system may provide air and fuel to an injector of each pre-chamber via a common delivery passage (or rail), such as shown in FIG. 2A. In particular, the TJI system may be operated to provide air and fuel to a pre-chamber during a compression stroke of a corresponding cylinder in order to provide ignition, such as depicted in FIG. 2B. Alternatively, the TJI system may be used to transfer gas between a first pre-chamber (and its corresponding cylinder) to a second pre-chamber (and its corresponding cylinder) by simultaneously or sequentially opening the injector of the first pre-chamber and the second pre-chamber, such as depicted in FIG. 2C. The TJI system, including the injector of each pre-chamber, may be controlled differently when the TJI system is used for ignition versus when the TJI system is used for gas transfer, such as according to the example method of FIG. 3. Examples of different timings used to operate TJI system components based on whether ignition or gas transfer is desired are shown in FIGS. 4-7. A prophetic example timeline for adjusting operation of the TJI system based on whether a fuel shut-off condition is present is shown in FIG. 8.

Figure 1:
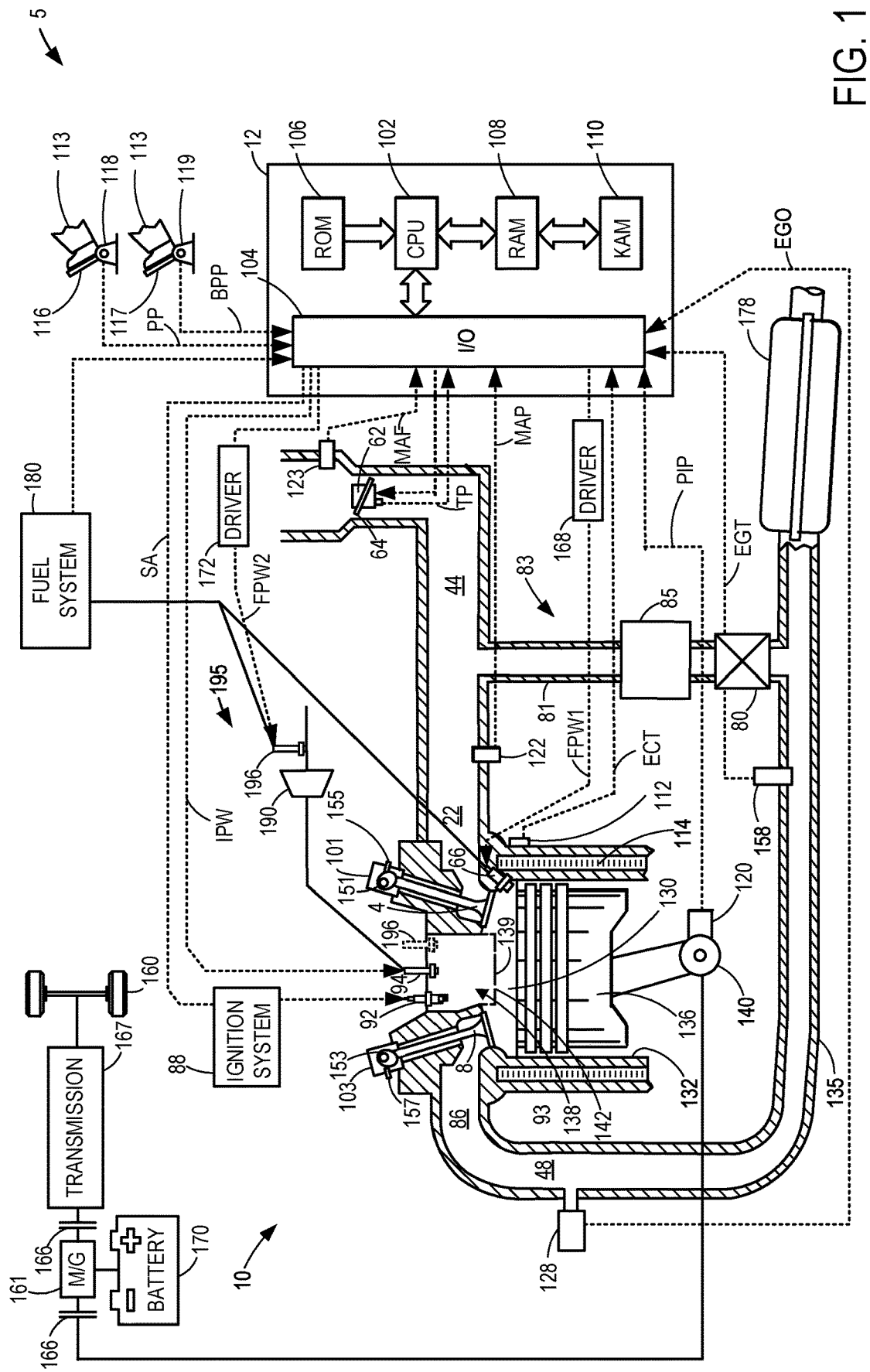
FIG. 1 shows an embodiment of a cylinder included in an engine system that includes a turbulent jet ignition system.
Figure 2B:
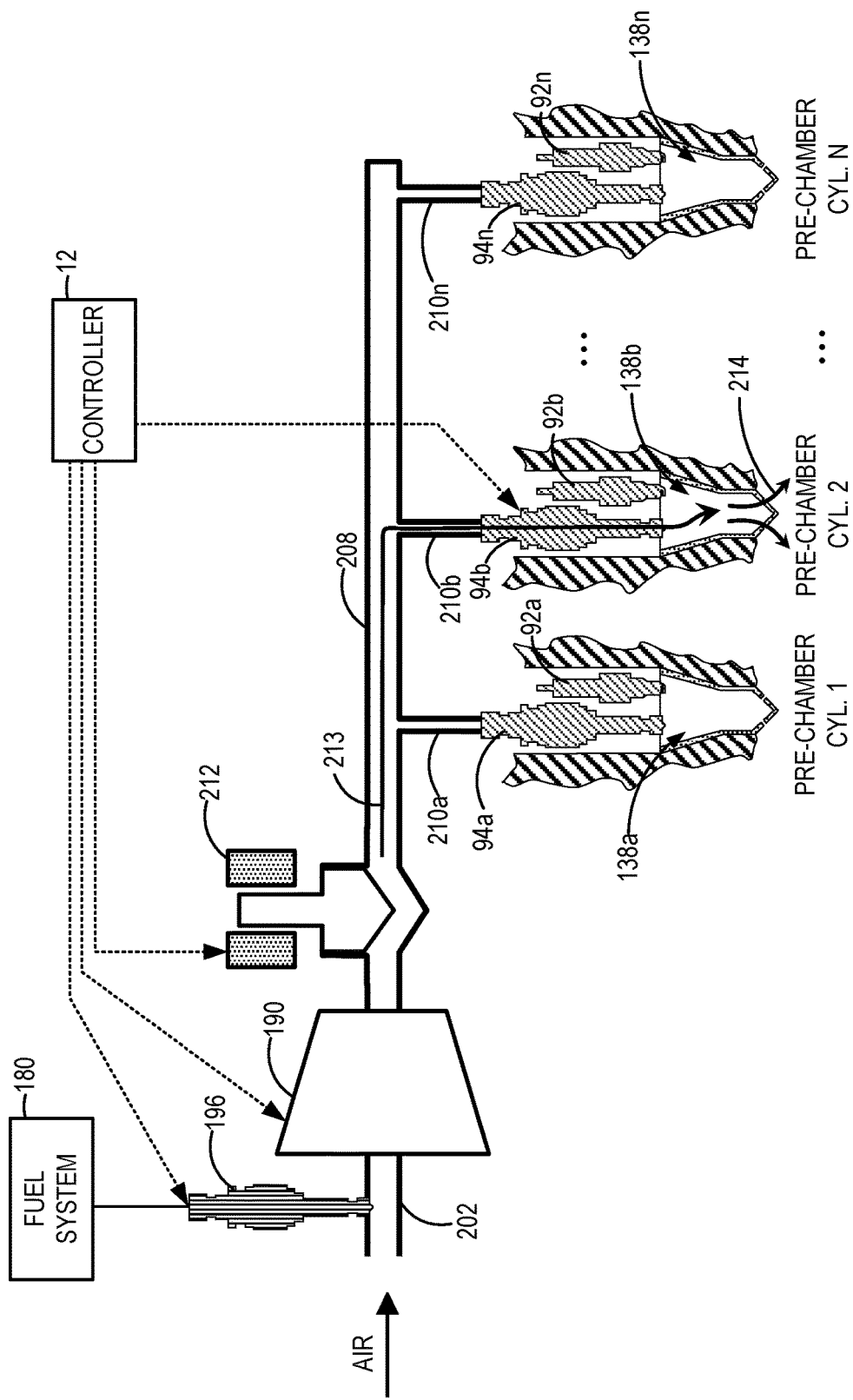
FIG. 2B shows a schematic depiction of the exemplary turbulent jet ignition system in a first operating mode.

Turning now to the figures, FIG. 1 shows a partial view of a single cylinder 130 of an internal combustion engine 10 that may be included in a vehicle 5. Engine 10 may be a multi-cylinder engine, and only one cylinder 130 is shown in FIG. 1. Cylinder (e.g., combustion chamber) 130 includes a coolant sleeve 114 and cylinder walls 132, with a piston 136 positioned therein and connected to a crankshaft 140. Combustion chamber 130 is shown communicating with an intake manifold 44 via an intake valve 4 and an intake port 22 and with an exhaust manifold 48 via an exhaust valve 8 and an exhaust port 86. A throttle 62 including a throttle plate 64 may be provided in an intake passage upstream of intake manifold 44 for varying a flow rate and/or pressure of intake air provided to the engine cylinders.

Engine 10 may be controlled at least partially by a controller 12 and by input from a vehicle operator 113 via an accelerator pedal 116 and an accelerator pedal position sensor 118 and via a brake pedal 117 and a brake pedal position sensor 119. Accelerator pedal position sensor 118 may send a pedal position signal (PP) to controller 12 corresponding to a position of accelerator pedal 116, and brake pedal position sensor 119 may send a brake pedal position (BPP) signal to controller 12 corresponding to a position of brake pedal 117.

In some examples, vehicle 5 may be a hybrid vehicle with multiple sources of torque available to one or more vehicle wheels 160. In other examples, vehicle 5 is a conventional vehicle with only an engine. In the example shown in FIG. 1, the vehicle includes engine 10 and an electric machine 161. Electric machine 161 may be a motor or a motor/generator and thus may also be referred to herein as an electric motor. Electric machine 161 receives electrical power from a system battery 170 to provide torque to vehicle wheels 160. For example, system battery 170 may be a traction battery. Electric machine 161 may also be operated as a generator to provide electrical power to charge system battery 170, for example, during a braking operation.

Crankshaft 140 of engine 10 and electric machine 161 are connected in a powertrain via a transmission 167 to vehicle wheels 160 when one or more clutches 166 are engaged. In the depicted example, a first clutch 166 is provided between crankshaft 140 and electric machine 161, and a second clutch 166 is provided between electric machine 161 and transmission 167. Controller 12 may send a signal to an actuator of each clutch 166 to engage or disengage the clutch, so as to connect or disconnect crankshaft 140 from electric machine 161 and the components connected thereto, and/or connect or disconnect electric machine 161 from transmission 167 and the components connected thereto. Transmission 167 may be a gearbox, a planetary gear system, or another type of transmission. The powertrain may be configured in various manners including as a parallel, a series, or a series-parallel hybrid vehicle.

An exhaust passage 135 can receive exhaust gases from other cylinders of engine 10 in addition to cylinder 130. An exhaust gas sensor 128 is shown coupled to exhaust passage 135 upstream of an emission control device 178. Exhaust gas sensor 128 may be selected from among various suitable sensors for providing an indication of an exhaust gas air-fuel ratio (AFR), such as a linear oxygen sensor or UEGO (universal or wide-range exhaust gas oxygen), a two-state oxygen sensor or EGO (as depicted), a HEGO (heated EGO), a nitrogen oxides (NOx) sensor, a hydrocarbon (HC) sensor, or a carbon monoxide (CO) sensor, for example. Emission control device 178 may be a three-way catalyst, a NOx trap, various other emission control devices, or combinations thereof. Herein, emission control device 178 will be described as a three-way catalyst, which may be simply referred to as a "catalyst."

In the depicted view, intake valve 4 and exhaust valve 8 are located at an upper region of combustion chamber 130. Intake valve 4 and exhaust valve 8 may be controlled by controller 12 using respective cam actuation systems including one or more cams. The cam actuation systems may utilize one or more of variable displacement engine (VDE), cam profile switching (CPS), variable cam timing (VCT), variable valve timing (VVT), and/or variable valve lift (VVL) systems to vary valve operation. In the depicted example, intake valve 4 is controlled by an intake cam 151, and exhaust valve 8 is controlled by an exhaust cam 153. The intake cam 151 may be actuated via an intake valve timing actuator 101 and the exhaust cam 153 may be actuated via an exhaust valve timing actuator 103 according to set intake and exhaust valve timings, respectively. In some examples, the intake valves and exhaust valves may be deactivated via the intake valve timing actuator 101 and exhaust valve timing actuator 103, respectively. The position of intake cam 151 and exhaust cam 153 may be determined by camshaft position sensors 155 and 157, respectively.

In some examples, the intake and/or exhaust valve may be controlled by electric valve actuation. For example, cylinder 130 may alternatively include an intake valve controlled via electric valve actuation and an exhaust valve controlled via cam actuation, including CPS and/or VCT systems. In still other examples, the intake and exhaust valves may be controlled by a common valve actuator or actuation system or a variable valve timing actuator or actuation system. The various valve control systems may be used to vary a timing, open duration, and lift of intake valve 4 and exhaust valve 8.

Cylinder 130 can have a compression ratio, which is a ratio of volumes when piston 136 is at bottom dead center to top dead center. Conventionally, the compression ratio is in a range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

As a non-limiting example, cylinder 130 is shown including a cylinder fuel injector 66. Fuel injector 66 is shown coupled directly to combustion chamber 130 for injecting liquid fuel directly therein in proportion to a pulse-width of a signal FPW1 received from controller 12 via an electronic driver 168. In this manner, fuel injector 66 provides what is known as direct injection (hereafter also referred to as "DI") of fuel into cylinder 130. In another example, fuel injector 66 may be a port injector providing fuel into the intake port upstream of cylinder 130. Further, while FIG. 1 shows fuel injected to the cylinder via a single injector, the engine may alternatively be operated by injecting fuel via multiple injectors, such as one direct injector and one port injector. For example, both port and direct injectors may be included in a configuration that is known as port fuel and direct injection (PFDI). In such a configuration, controller 12 may vary a relative amount of injection from each injector. In some examples, cylinder 130 may include additional fuel injectors.

Fuel may be delivered to fuel injector 66 from a high-pressure fuel system 180 including one or more fuel tanks, fuel pumps, and a fuel rail. Alternatively, fuel may be delivered by a single stage fuel pump at a lower pressure. Further, while not shown, the fuel tanks may include a pressure transducer providing a signal to controller 12. Fuel tanks in fuel system 180 may hold fuel with different fuel qualities, such as different fuel compositions. These differences may include different alcohol content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of ethanol and water, a mixture of water and methanol, a mixture of alcohols, etc. In this way, air and fuel are delivered to cylinder 130, which may produce a combustible air-fuel mixture.

Fuel may be delivered by fuel injector 66 to cylinder 130 during a single cycle of the cylinder. Further, the distribution and/or relative amount of fuel delivered from cylinder fuel injector 66 may vary with operating conditions. Furthermore, for a single combustion event, multiple injections of the delivered fuel may be performed per cycle. The multiple injections may be performed during the compression stroke, intake stroke, or any appropriate combination thereof.

In the example shown in FIG. 1, engine 10 includes a turbulent jet ignition (TJI) system 195. TJI system 195 may also be referred to herein as a turbulent jet system. To provide pre-chamber ignition under select operating modes, each cylinder 130 of engine 10 includes a pre-chamber 138 of TJI system 195. Pre-chamber 138 is defined by pre-chamber walls 139 and includes a pre-chamber spark plug 92 (e.g., an igniter) and a pre-chamber injector 94. Pre-chamber injector 94 is shown directly coupled to pre-chamber 138 for injecting air or an air-fuel mixture into the pre-chamber. In some examples, pre-chamber injector 94 is an electromagnetic (e.g., solenoid) injector.

Air may be delivered to pre-chamber injector 94 from a compressor 190, which in some examples may be a pump. Note that in relation to the pre-chamber air system, the term "air" may refer herein to ambient air, oxygen (e.g., $O_2$), hydrogen (e.g., $H_2$), another combustible gas, or a mixture of such gases (e.g., oxygen-enriched air). Compressor 190 may be driven by an electric motor via electrical power received from system battery 170, for example. In some examples, compressor 190 may be driven at a constant speed to provide a desired pressure downstream of compressor 190. In other examples, the speed of compressor 190 may be varied in order to adjust the pressure upstream of compressor 190. Further, a pre-chamber fuel injector 196 is shown coupled upstream of compressor 190. However, in other examples, pre-chamber fuel injector 196 may be positioned downstream of compressor 190. Pre-chamber fuel injector 196 may directly inject fuel into an air delivery passage coupled to pre-chamber injector 94 in proportion to a pulse-width of a signal FPW2 received from controller 12 via an electronic driver 172. Fuel may be provided to pre-chamber fuel injector 196 by high-pressure fuel system 180, described above. Alternatively, fuel may be provided to pre-chamber fuel injector 196 from a dedicated pre-chamber fuel system that may be included within or distinct from high-pressure fuel system 180. The fuel provided by pre-chamber fuel injector 196 may mix with the air provided by compressor 190 before being delivered to pre-chamber injector 94. Pre-chamber injector 94 may be a gaseous injector directly injecting the received air and/or fuel into pre-chamber 138 in proportion to a pulse-width of a signal IPW received from controller 12. Thus, both air and fuel are delivered to pre-chamber 138, which may produce an air-fuel mixture with an AFR that may differ from an AFR in cylinder 130. In one example, the AFR in pre-chamber 138 may be richer (e.g., have a higher proportion of fuel relative to air) than the AFR in cylinder 130. In another example, the AFR in the pre-chamber may be the same as the AFR in the cylinder. In yet another example, the AFR in pre-chamber 138 may be leaner (e.g., have a higher proportion of air relative to fuel) than the AFR in cylinder 130.

Note that compressor 190 and pre-chamber fuel injector 196 may provide air and fuel to the pre-chamber of every cylinder of engine 10. Further, during some operating conditions, pre-chamber fuel injector 196 may be disabled so that no fuel is injected via pre-chamber injector 94, as will be elaborated herein. For example, pre-chamber fuel injector 196 may be disabled when TJI system 195 is operated to transfer gas to or from cylinder 130 instead of providing ignition to cylinder 130.

However, in an alternative configuration, pre-chamber 138 may include separate air and fuel injectors instead of a combined air and fuel injector. For example, instead of providing fuel to every pre-chamber of the engine by including pre-chamber fuel injector 196 coupled to the air delivery passage upstream of pre-chamber injector 94, pre-chamber fuel injector 196 instead may be directly coupled to pre-chamber 138 for directly injecting fuel therein. Further, each other pre-chamber of engine 10 may similarly include a pre-chamber fuel injector coupled directly thereto. In such a configuration, pre-chamber injector 94 may inject only air (instead of air and/or fuel). Such a configuration may enable additional operating flexibility of TJI system 195 by separately controlling whether air, fuel, or both are injected into pre-chamber 138.

Pre-chamber walls 139 include a plurality of openings 142. The plurality of openings 142 provide orifices between pre-chamber 138 and cylinder 130, fluidically coupling an interior of pre-chamber 138 to an interior of cylinder 130. As such, during some conditions, gases may flow between the interior of pre-chamber 138 and the interior of cylinder 130. For example, the gases (e.g., air, fuel, and/or residual combustion gases) may flow through each of the plurality of openings 142 with a directionality and rate based on a pressure difference across each of the plurality of openings 142 (e.g., between the interior of pre-chamber 138 and the interior of cylinder 130). The plurality of openings 142 may also provide an ignition flame from pre-chamber 138 to cylinder 130, as will be elaborated below.

An ignition system 88 may provide an ignition spark to pre-chamber 138 via pre-chamber spark plug 92 in response to a spark advance signal SA from controller 12, under select operating modes. Thus, pre-chamber spark plug 92 comprises an igniter of TJI system 195. A timing of signal SA may be adjusted based on engine operating conditions and a driver torque demand. For example, spark may be provided at maximum brake torque (MBT) timing to maximize engine power and efficiency. Controller 12 may input engine operating conditions, including an engine speed, an engine load, and an exhaust gas AFR, into a look-up table, which may output the corresponding MBT timing for the input engine operating conditions. In other examples, spark may be retarded from MBT to prevent an occurrence of knock. In still other examples, spark may be retarded from MBT to reduce engine torque, such as due to a decrease in the driver-demanded torque or a transmission gear shift event. When pre-chamber spark plug 92 provides the ignition spark to pre-chamber 138, the air-fuel mixture within the pre-chamber may combust, with the increased pressure of combustion sending jets of flame and hot gases into cylinder 130 via the plurality of openings 142. The plurality of openings 142 may be arranged such that the jets of flame are evenly distributed in cylinder 130. The jets of flame may ignite the air-fuel mixture in cylinder 130, causing combustion. After combustion, a mixture of exhaust gases from both pre-chamber 138 and cylinder 130 may be exhausted from cylinder 130 to exhaust manifold 48 via opening of exhaust valve 8.

In some examples, cylinder 130 of engine 10 may further include a main chamber spark plug (e.g., a cylinder spark plug) for initiating combustion (not shown). When included, the main chamber spark plug is directly coupled to the main combustion chamber (e.g., combustion chamber 130) of the cylinder, and thus provides an igniter that is distinct from pre-chamber spark plug 92 of TJI system 195. Ignition system 88 may provide an ignition spark to cylinder 130 via the main chamber spark plug in response to the spark advance signal SA from controller 12, under select operating modes. A timing of signal SA may be adjusted based on engine operating conditions and a driver torque demand, similar to the manner described above with respect to pre-chamber spark plug 92. For example, the main chamber spark plug may be used to initiate combustion during conditions when TJI system 195 is not used, such as during low load and/or cold start conditions.

External exhaust gas recirculation (EGR) may be provided to engine 10 via a high pressure EGR system 83, delivering exhaust gas from a zone of higher pressure in exhaust passage 135 to a zone of lower pressure in intake manifold 44, downstream of throttle 62, via an EGR passage 81. An amount EGR provided to intake manifold 44 may be varied by controller 12 via an EGR valve 80. For example, controller 12 may be configured to actuate and adjust a position of EGR valve 80 to adjust the amount of exhaust gas flowing through EGR passage 81. EGR valve 80 may be adjusted between a fully closed position, in which exhaust gas flow through EGR passage 81 is blocked, and a fully open position, in which exhaust gas flow through the EGR passage is maximally enabled. As an example, EGR valve 80 may be continuously variable between the fully closed position and the fully open position. As such, the controller may increase a degree of opening of EGR valve 80 to increase an amount of EGR provided to intake manifold 44 and decrease the degree of opening of EGR valve 80 to decrease the amount of EGR provided to intake manifold 44. As an example, EGR valve 80 may be an electronically activated solenoid valve. In other examples, EGR valve 80 may be positioned by an incorporated stepper motor, which may be actuated by controller 12 to adjust the position of EGR valve 80 through a range of discreet steps (e.g., 52 steps), or EGR valve 80 may be another type of flow control valve. Further, EGR may be cooled via passing through an EGR cooler 85 within EGR passage 81. EGR cooler 85 may reject heat from the EGR gases to engine coolant, for example.

Under some conditions, EGR system 83 may be used to regulate a temperature of the air and fuel mixture within the combustion chamber. Further, EGR may be desired to attain a desired engine dilution, thereby increasing fuel efficiency and emissions quality, such as emissions of nitrogen oxides. As an example, EGR may be requested at low-to-mid engine loads. Thus, it may be desirable to measure or estimate an EGR mass flow. EGR sensors may be arranged within EGR passage 81 and may provide an indication of one or more of mass flow, pressure, and temperature of the exhaust gas, for example. An amount of EGR requested may be based on engine operating conditions, including engine load (as estimated via accelerator pedal position sensor 118), engine speed (as estimated via a crankshaft acceleration or position sensor, as elaborated below), engine temperature (as estimated via an engine coolant temperature sensor 112), etc. For example, controller 12 may refer to a look-up table having the engine speed and load as the input and output a desired amount of EGR corresponding to the input engine speed-load. In another example, controller 12 may determine the desired amount of EGR (e.g., desired EGR flow rate) through logic rules that directly take into account parameters such as engine load, engine speed, engine temperature, etc. In still other examples, controller 12 may rely on a model that correlates a change in engine load with a change in a dilution request, and further correlates the change in the dilution request with a change in the amount of EGR requested. For example, as the engine load increases from a low load to a mid load, the amount of EGR requested may increase, and then as the engine load increases from a mid load to a high load, the amount of EGR requested may decrease. Controller 12 may further determine the amount of EGR requested by taking into account a best fuel economy mapping for a desired dilution rate. After determining the amount of EGR requested, controller 12 may refer to a look-up table having the requested amount of EGR as the input and a signal corresponding to a degree of opening to apply to EGR valve 80 (e.g., as sent to the stepper motor or other valve actuation device) as the output. In particular, engine 10 may be operated with a higher engine dilution due when using TR system 195 to provide ignition than when direct in-cylinder spark ignition is used.

Controller 12 is shown in FIG. 1 as a microcomputer, including a microprocessor unit 102, input/output ports 104, an electronic storage medium for executable programs and calibration values shown as a read only memory 106 in this particular example, a random access memory 108, a keep alive memory 110, and a data bus. Storage medium read-only (e.g., non-transitory) memory 106 can be programmed with computer readable data representing instructions executable by microprocessor unit 102 for performing the methods and routines described herein as well as other variants that are anticipated but not specifically listed.

Controller 12 may receive various signals from sensors coupled to engine 10, in addition to those signals previously discussed, including a measurement of inducted mass air flow (MAF) from a mass air flow sensor 123; an engine coolant temperature signal (ECT) from engine coolant temperature sensor 112 coupled to coolant sleeve 114; signal EGO from exhaust gas sensor 128, which may be used by controller 12 to determine the AFR of the exhaust gas; an exhaust gas temperature signal (EGT) from a temperature sensor 158 coupled to exhaust passage 135; a profile ignition pickup signal (PIP) from a Hall effect sensor 120 (or other type) coupled to crankshaft 140; a throttle position (TP) from a throttle position sensor coupled to throttle 62; and an absolute manifold pressure signal (MAP) from a MAP sensor 122 coupled to intake manifold 44. An engine speed signal, RPM, may be generated by controller 12 from signal PIP. The manifold pressure signal MAP from the manifold pressure sensor may be used to provide an indication of vacuum or pressure in the intake manifold.

Based on input from one or more of the above-mentioned sensors, controller 12 may adjust one or more actuators, such as cylinder fuel injector 66, throttle 62, pre-chamber spark plug 92, pre-chamber fuel injector 196, pre-chamber injector 94, the intake/exhaust valves and cams, etc. The controller may receive input data from the various sensors, process the input data, and trigger the actuators in response to the processed input data based on instruction or code programmed therein corresponding to one or more routines, an example of which is described with respect to FIG. 3.

Continuing to FIGS. 2A-2C, an example configuration of a TJI system 200 is shown. TJI system 200 is one example of TJI system 195 of FIG. 1. Thus, as one example, TJI system 200 may be included in engine 10 of FIG. 1. Components shown in FIGS. 2A-2C that function the same as components shown in FIG. 1 are numbered the same and will not be re-introduced. Further, it may be understood that components illustrated in FIG. 1 that are not shown in FIGS. 2A-2C may be present. Additionally, letters (e.g., "a," "b," and the like) designate a set of components included in or coupled to one cylinder of the multi-cylinder engine. That is, the "a" components (e.g., pre-chamber 138*a*) are included in or coupled to a first cylinder (e.g., cylinder 1), the "b" components (e.g., pre-chamber 138*b*) are included in or coupled to a second cylinder (e.g., cylinder 2), etc. In the example shown, "n" components are shown with respect to cylinder N, where N is any integer number of cylinders in the engine. Thus, TR system 200 may be adapted to provide air and/or fuel to each cylinder of the engine.

Air is provided to compressor 190 via an air intake passage 202. In the example shown, pre-chamber fuel injector 196 is coupled to air intake passage 202 upstream of compressor 190. However, as noted above with respect to FIG. 1, in other examples, pre-chamber fuel injector 196 may be coupled downstream of compressor 190. Alternatively, each pre-chamber may include its own pre-chamber fuel injector, as also described above with respect to FIG. 1. After being compressed (e.g., pressurized) by compressor 190, the air (and fuel, in some examples) is delivered to a common delivery passage 208. Common delivery passage (e.g., common rail) 208 includes a plurality of ports for delivering the air (and fuel) to the pre-chamber injector of each cylinder. In the example shown, ports 210*a*, 210*b*, and 210*n* deliver the air (or air and fuel) to pre-chamber injectors 94*a*, 94*b*, and 94*n*, respectively. In some examples, air intake passage 202 and common delivery passage 208 may be collectively referred to as a "rail."

A valve 212 is disposed in common delivery passage 208 downstream of compressor 190 and upstream of ports 210*a*, 210*b*, and 210*n* (e.g., positioned between compressor 190 and port 210*a*). Valve 212 may be a solenoid valve, as shown, that is electronically controlled via controller 12. Valve 212 regulates the flow (or supply) of air (and fuel) from compressor 190 to ports 210*a*, 210*b*, and 210*n*. For example, valve 212 may be fully closed when de-energized and open when energized in response to a control signal from controller 12. When energized, adjusting an amount of current flowing through solenoid coils of valve 212 may adjust a degree of opening of valve 212. For example, the current may induce a magnetic field that pulls a plunger of valve 212 toward the solenoid coils, thereby opening the valve. However, in other examples, valve 212 may be a mechanical valve, such as a one-way check valve, that enables flow from compressor 190 to ports 210*a*, 210*b*, and 210*n* and blocks flow from ports 210*a*, 210*b*, and 210*n* to compressor 190 without input from controller 12.

In addition to valve 212, controller 12 may adjust operation of each of compressor 190, pre-chamber fuel injector 196, pre-chamber injector 94*a*, pre-chamber injector 94*b*, pre-chamber injector 94*n*, pre-chamber spark plug 92*a*, pre-chamber spark plug 92*b*, and pre-chamber spark plug 92*n* via corresponding control signals, as shown in FIG. 2A. Controller 12 may adjust a timing, duration, and/or pulse-width of each respective control signal in order to achieve a desired function of TJI system 200. As one example, when TJI system 200 is operated in an ignition mode, TJI system 200 functions to initiate combustion in each cylinder via the corresponding pre-chamber 138*a*, 138*b*, or 138*n*. For example, controller 12 opens valve 212 and operates pre-chamber fuel injector 196 to deliver fuel upstream of compressor 190, which is operated to increase a pressure of an air-fuel mixture provided to each pre-chamber injector 94*a*, 94*b*, and 94*n* via the corresponding port 210*a*, 210*b*, and 210*n*, respectively. Each pre-chamber injector 94*a*, 94*b*, and 94*n* is actuated open via controller 12 at an appropriate time during an engine cycle, such as during a compression stroke of the corresponding cylinder, to inject the air-fuel mixture into the corresponding pre-chamber. The air-fuel mixture in the pre-chamber is ignited via the corresponding pre-chamber spark plug 92*a*, 92*b*, or 92*n* to generate an ignition spark at a desired pre-chamber spark timing. Operating in the ignition mode will be further described below with reference to FIGS. 3 and 4.

Referring now to FIG. 2B, gas flow dynamics in TJI system 200 while operating in the ignition mode will be described. Pre-chamber fuel injector 196 injects fuel received from fuel system 180 in proportion to a pulse-width of the corresponding control signal received from controller 12 (e.g., signal FPW2 shown in FIG. 1) into air intake passage 202. Compressor 190 is operated at a non-zero speed according to the corresponding control signal received from controller 12 to compress the injected fuel and air inducted through air intake passage 202, delivering a pressurized air-fuel mixture to common delivery passage 208. Further, valve 212 is maintained open responsive to the corresponding control signal from controller 12, enabling the pressurized air-fuel mixture to flow to ports 210a, 210b, and 210n. In the example shown in FIG. 2B, pre-chamber injector 94b is opened according to a pulse-width of the corresponding control signal from controller 12 (e.g., signal IPW shown in FIG. 1) in order to inject the pressurized air-fuel mixture in a first direction into pre-chamber 138b, as shown by a flow path 213. Further, a portion of the pressurized air-fuel mixture may flow out of orifices coupling an internal volume of pre-chamber 138b to an internal volume of the second cylinder (e.g., openings 142 shown in FIG. 1), as indicated by a flow path 214, while a remaining amount of the pressurized air-fuel mixture in pre-chamber 138b may be subsequently ignited by pre-chamber spark plug 92b in response to a spark advance control signal from controller 12. The combustion may be substantially stoichiometric in one example.

As another example, controller 12 may send control signals with a different timing, duration, and/or pulse-width when TJI system 200 is operated in a gas transfer mode, where TJI system 200 functions to transfer heated gas between cylinders via the corresponding pre-chambers. Referring now to FIG. 2C, controller 12 maintains pre-chamber fuel injector 196 fully closed by discontinuing the corresponding control signal (e.g., adjusting the duration and/or pulse-width to zero) so that fuel is not delivered upstream of compressor 190. Further, pressurized air is not desired in the gas transfer mode, and so compressor 190 is deactivated (e.g., set to a speed of zero). In order to prevent backflow to compressor 190, controller 12 may fully close valve 212 by discontinuing the corresponding control signal (e.g., adjusting the duration and/or pulse-width to zero) and de-energizing valve 212. Pairs of pre-chamber injectors 94a, 94b, and 94n are actuated open via controller 12 at an appropriate time during an engine cycle to flow hotter, compressed gas from one cylinder to another, as will be further described below with reference to FIG. 3 and FIGS. 5-7.

In the example shown in FIG. 2C, higher pressure gas from the first cylinder flows into pre-chamber 138a via the orifices at a first time in an engine cycle, as indicated by a flow path 216. For example, the first cylinder may be late in a compression stroke or early in an expansion stroke at the first time, having a relatively high pressure and temperature due to a piston within the cylinder being close to top-dead center. The pre-chamber injector 94a is opened at the first time via the corresponding control signal from controller 12, and instead of injecting pressurized air (and fuel) from common delivery passage 208 into the pre-chamber 138a, the higher pressure gas received from the first cylinder flows in a second direction through the open pre-chamber injector 94a and into common delivery passage 208 because a pressure in common delivery passage 208 is lower than the higher pressure gas. The second cylinder may be in an intake stroke or an exhaust stroke at the first time, and a pressure in the second cylinder (and pre-chamber 138b) is lower than the first cylinder (and pre-chamber 138a). The pre-chamber injector 94b is also opened at the first time via the corresponding control signal from controller 12, and because the pressure in pre-chamber 138b is lower than the higher pressure gas in common delivery passage 208, the higher pressure gas flows from common delivery passage 208, through the open pre-chamber injector 94b, and into pre-chamber 138b. Thus, as illustrated by a flow path 218, the higher pressure gas flows from pre-chamber 138a of the first cylinder to common delivery passage 208 via the open pre-chamber injector 94a and port 210a and continues into pre-chamber 138b of the second cylinder via port 210b and the open pre-chamber injector 94b. Further, at least a portion of the hotter, higher pressure gas flows into the second cylinder via the orifices coupling the internal volume of pre-chamber 138b to the internal volume of the second cylinder, as indicated by a flow path 220. In this way, hotter, compressed gas from the first cylinder is transferred to the second cylinder via TJI system 200 by operating the TJI system 200 in the gas transfer mode.

Figure 3:
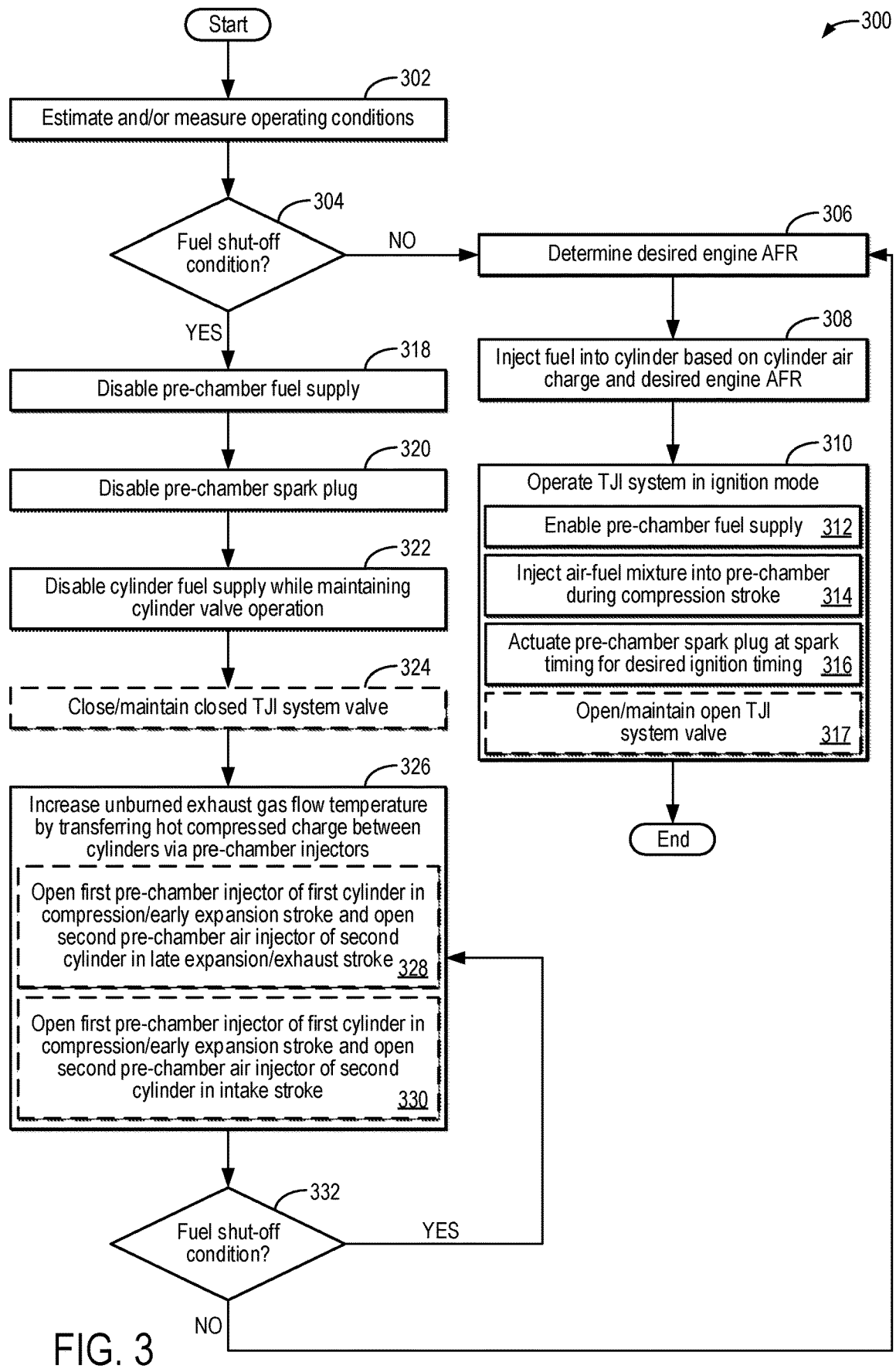
FIG. 3 is a flow chart of an example method for operating a turbulent jet ignition system for providing ignition while an engine is operating in a combustion mode and for providing gas transfer when the engine is operated in a fuel shut-off mode.

Turning now to FIG. 3, an example method 300 for operating a TJI system is shown. For example, the TJI system may be TJI system 200 shown in FIGS. 2A-2C, which is configured to provide pre-chamber ignition or transfer gases between cylinders, depending on an operating mode. Although method 300 will be described with respect to the engine system shown in FIG. 1 and the TJI system shown in FIGS. 2A-2C, method 300 may be applied to other engine systems including a TJI system without parting from the scope of this disclosure. Instructions for carrying out method 300 may be executed by a controller (e.g., controller 12 of FIGS. 1 and 2A-2C) based on instructions stored on a memory of the controller and in conjunction with signals received from sensors of the engine system, such as the sensors described above with reference to FIG. 1 and elaborated below. The controller may employ actuators of the engine system to adjust engine operation according to the method described below.

At 302, method 300 includes estimating and/or measuring operating conditions. The operating conditions may include, for example, an engine speed, an intake manifold pressure (e.g., MAP), a mass air flow of intake air provided to the engine (e.g., MAF), an engine temperature, an engine torque demand, an exhaust gas temperature, a measured engine AFR, an engine dilution, an accelerator pedal position, a brake pedal position, etc. As one example, the exhaust gas temperature may be measured by the exhaust gas temperature sensor, such as temperature sensor 158 of FIG. 1, and may be used to infer a temperature of a catalyst (e.g., emission control device 178 of FIG. 1). As another example, the measured AFR may be determined based on output from an exhaust gas oxygen sensor (e.g., exhaust gas sensor 128 of FIG. 1). The intake manifold pressure may be measured by a MAP sensor, such as MAP sensor 122 of FIG. 1, and the inducted mass air flow may be measured by a MAF sensor, such as MAF sensor 123 of FIG. 1, and may be used by the controller to determine an air charge inducted into each cylinder. As still another example, the engine temperature may be determined from an output of an engine coolant temperature sensor, such as ECT sensor 112 of FIG. 1. As yet another example, the engine dilution may be determined based on a position of an EGR valve, such as EGR valve 80 of FIG. 1. Further, the accelerator pedal position may be measured by an accelerator pedal position sensor, such as accelerator pedal position sensor 118 of FIG. 1, and the brake pedal position may be measured by a brake pedal position sensor, such as brake pedal position sensor 119 of FIG. 1. Together, the accelerator pedal position and the brake pedal position may indicate a demanded amount of engine torque.

At 304, it is determined if a fuel shut-off condition is present. As one example, a fuel shut-off condition may be present responsive to the accelerator pedal not being depressed. For example, the vehicle operator may perform a "tip-out" where the accelerator pedal goes from a depressed position to a neutral, non-depressed (or less depressed) position, indicating a rapid decrease in the torque demand. Additionally or alternatively, the fuel shut-off condition may be present responsive to the brake pedal being depressed. For example, based on the accelerator pedal position and the brake pedal position, the controller may determine that the torque demand of the engine is less than a current torque output of the engine, and a fuel shut-off event may be requested in order to decrease the current torque output of the engine to the torque demand (e.g., a desired torque output). As another example, the fuel shut-off event may be desired for engine braking.

In some examples, the fuel shut-off condition may be selectively enabled while the engine speed is greater than a pre-determined non-zero threshold engine speed that is stored in a memory of the controller. At engine speeds below the threshold engine speed, the engine may inadvertently shut down while unfueled. As such, the fuel shut-off condition may not be present while the engine speed is less than the threshold engine speed.

If the fuel shut-off condition is not present, method 300 proceeds to 306 and includes determining a desired engine AFR. As one example, the desired engine AFR may be stoichiometry in order to maximize an efficiency of the catalyst. In other examples, the desired engine AFR may be varied from stoichiometry, such as during catalyst rebalancing or other conditions that utilize non-stoichiometric AFRs.

At 308, method 308 includes injecting fuel into each cylinder based on the air charge inducted into each cylinder (also referred to herein as a cylinder air charge) and the desired engine AFR. To fuel each cylinder, the controller may input the cylinder air charge (e.g., mass of air) and the desired engine AFR into a look-up table, algorithm, or map stored in a memory of the controller, which may output the total amount of fuel to inject into the cylinder. Further, the controller may determine the timing of the fuel injection(s) based on a plurality of engine operating conditions, such as the engine speed, the engine temperature, and the engine load. The controller may input the plurality of engine operating conditions (e.g., the engine speed, the engine temperature, and the engine load) into another look-up table, algorithm, or map stored in the memory of the controller, which may output the timing (e.g., a start of injection timing) for each of the fuel injection(s). When multiple injections are used, the output may further include a fraction of the total amount of fuel to deliver via each injection. The controller may then adjust and transmit the fuel pulse-width signal to the cylinder fuel injector to inject the determined amount of fuel into the cylinder at the determined timing(s). The fuel may be injected, for example, by a fuel injector (e.g., fuel injector 66 of FIG. 1) that receives a fuel pulse-width signal (e.g., FPW1 from FIG. 1) from the controller. As an example, the fuel may be directly injected into each cylinder by the corresponding fuel injector during a compression stroke of the cylinder via one or more injections. Additionally or alternatively, fuel may be directly injected into each cylinder during an intake stroke of the cylinder. In still other examples, port fuel injection may be used in addition to or as an alternative to direct injection.

At 310, method 300 includes operating the TJI system in an ignition mode. An example of operating TJI system in the ignition mode is shown in FIG. 2B and will be further described below in FIG. 4. When the TJI system is operated in the ignition mode, the TJI system initiates combustion in the cylinder using the pre-chamber and is not used to transfer gas between cylinders, as will be elaborated below.

Operating the TJI system in the ignition mode includes enabling a pre-chamber fuel supply, as indicated at 312. For example, the controller operates a pre-chamber fuel injector (e.g., pre-chamber fuel injector 196 of FIGS. 1 and 2A-2C) to deliver fuel upstream of a compressor (e.g., compressor 190 shown in FIG. 1), thus providing an air-fuel mixture to the pre-chamber. For example, the pre-chamber fuel injector may receive a fuel pulse-width signal (e.g., FPW2 from FIG. 1) from the controller and inject fuel directly into an air intake passage (e.g., air intake passage 202 shown in FIGS. 2A-2C) according to the pulse-width of the signal. As one example, the controller may determine the pulse-width and the timing(s) of the fuel pulse-width signal based on, for example, an air pressure and/or mass flow rate provided by the compressor and a desired AFR for operating the pre-chamber. In some examples, the fuel pulse-width may be determined based on a pressure in the air intake passage. The desired AFR for operating the pre-chamber may be the same or different than the desired AFR of the cylinder. For example, the desired AFR for operating the pre-chamber may be stoichiometry. The controller may input the desired AFR for operating the pre-chamber and the air pressure and/or mass flow rate provided by the compressor into a look-up table, algorithm, or map stored in the memory of the controller, which may output the pulse-width and the timing (s) of the fuel pulse-width signal to send to the pre-chamber fuel injector. The controller may then generate and transmit the fuel pulse-width signal to the pre-chamber fuel injector at the determined timing(s). Thus, the pre-chamber fuel injector may supply the fuel to the pre-chamber (and every other pre-chamber of the TJI system), and the fuel provided by pre-chamber fuel injector may mix with the air provided by the compressor before being delivered to the pre-chamber injector via a common delivery passage or rail (e.g., common delivery passage 208 of FIGS. 2A-2C).

Operating the TJI system in the ignition mode further includes injecting the air-fuel mixture into the pre-chamber during the compression stroke, as indicated at 314. For example, the pre-chamber injector receives the air-fuel mixture from the common delivery passage via a port and is actuated open by the controller during the compression stroke of the cylinder to inject the air-fuel mixture into the pre-chamber. For example, the pre-chamber injector may be opened according to an injector pulse-width signal received from the controller (e.g., signal IPW shown in FIG. 1). As one example, the controller may determine a timing and/or pulse-width of the injector pulse-width signal based on one or more operating conditions (e.g., engine speed, engine load, and a pressure in the common delivery passage), such as by inputting the one or more operating conditions into a look-up table, algorithm, or map stored in memory. The look-up table, algorithm, and/or map may output the timing and/or pulse-width of the injector pulse-width signal, and the controller may generate and transmit the injector pulse-width signal at the determined timing. In some examples, injecting the air-fuel mixture into the pre-chamber may purge gases introduced from the cylinder and remaining in the pre-chamber from a previous combustion cycle while also providing the air-fuel mixture for combustion in the pre-chamber. In other examples, multiple injections may be performed, such as to purge the pre-chamber via a first injection and to provide the air-fuel mixture for combustion via a second injection.

Operating the TJI system in the ignition mode further includes actuating a pre-chamber spark plug at a desired ignition timing, as indicated at 316. For example, the pre-chamber spark plug may be pre-chamber spark plug 92 shown in FIG. 1. The desired ignition timing refers to when to ignite the air-fuel mixture in the pre-chamber relative to a position of a piston (e.g., piston 136 shown in FIG. 1) in the cylinder. The desired ignition timing may be determined based on the demanded amount of engine torque, for example. For example, the desired ignition timing may be adjusted relative to the ignition timing for maximum brake torque (MBT) based on engine operating conditions. For example, the desired ignition timing may be advanced closer to MBT timing to increase a torque output of the cylinder. In one example, the controller may input one or more engine operating conditions (e.g., the demanded amount of engine torque, the engine speed, the engine load, the exhaust gas temperature, the desired pre-chamber AFR, and the desired cylinder AFR) into one or more look-up tables, functions, or maps to determine the desired ignition timing. In another example, the controller may make a logical determination (e.g., regarding the desired ignition timing) based on logic rules that are a function of the one or more engine operating conditions, including the demanded amount of engine torque. Further, it may be understood that the desired ignition timing may be later when the TJI system is operated in the ignition mode relative to when direct in-cylinder spark ignition is used for a same combustion phasing due to a faster burn rate produced via the TJI system.

To generate the ignition spark in the pre-chamber at the desired ignition timing, the controller may generate a control signal (e.g., signal SA) that is sent to an ignition system (e.g., ignition system 88 of FIGS. 1 and 2A-2C) to actuate the pre-chamber spark plug at the desired ignition timing. When the pre-chamber spark plug provides the ignition spark to the pre-chamber, the air-fuel mixture within the pre-chamber may combust, with the increased pressure of combustion sending jets of flame and hot gases into the cylinder through a plurality of openings (e.g., the plurality of openings 142 shown in FIG. 1). The jets of flame may ignite the air-fuel mixture in the cylinder, resulting in a combustion reaction within the cylinder that produces torque.

In some examples, operating the TJI system in the ignition mode includes opening or maintaining open a valve, as optionally indicated at 317. When included, the valve (e.g., valve 212 of FIGS. 2A-2C) enables flow between the air intake passage and the common delivery passage when at least partially open and blocks flow between the air intake passage and the common delivery passage when closed. Thus, the valve is actuated open (if closed) or maintained fully opened (if already open) while the TJI system is operated in the ignition mode. For example, the controller may energize the valve to open the while operating the TJI system in the ignition mode. In other examples, where the valve may be a check valve, the valve may open due to pressures from fuel injection and from the air compressor. Furthermore, opening the valve allows for fuel and air upstream of the valve to reach pre-chamber injectors (e.g., pre-chamber injectors 94a, 94b, etc. shown in FIGS. 2A-2C) and to be injected into the pre-chambers for ignition.

Method 300 may then end. For example, method 300 may be repeated at a pre-determined frequency during engine operation to provide robust pre-chamber ignition to the cylinder across a variety of operating conditions.

Returning to 304, if the fuel shut-off condition is present, method 300 proceeds to 318 and includes disabling the pre-chamber fuel supply, such as by disabling or deactivating the pre-chamber fuel injector. When the pre-chamber fuel injector is disabled, the pre-chamber fuel injector stops receiving the fuel pulse-width signal from the controller. As such, the pre-chamber fuel injector will not open and will not inject fuel into the air intake passage upstream of the compressor. As a result, the compressor may supply air to the common delivery passage and not an air-fuel mixture.

At 320, method 300 includes disabling the pre-chamber spark plug. Since the pre-chamber is not being supplied with fuel, the pre-chamber spark plug will not have an air-fuel mixture to ignite with a spark. To disable the pre-chamber spark plug, the controller may not send the spark advance signal to the pre-chamber spark plug, for example. As a result, the pre-chamber spark plug does not generate a spark in the pre-chamber, and combustion may not occur within the pre-chamber. Thus, the pre-chamber (and the TJI system) is not used for ignition.

At 322, method 300 includes disabling cylinder fuel supply while maintaining cylinder valve operation. To disable fueling to the cylinder, the controller may discontinue the fuel pulse width signal to the cylinder fuel injector. In some examples, all cylinders of the engine may have discontinued direct fuel injection, and in other examples only a portion of the cylinders may have discontinued direct fuel injection. As a further example, the controller may discontinue direct fueling in at least two or more cylinders. Maintaining cylinder valve operation may include opening the intake valve during the late exhaust stroke or early intake stroke and closing the intake valve near the end of the intake stroke. It should be appreciated here that the strokes are referred to using the 4-stoke combustion cycle convention, even though in this example those stroke labels do not necessary describe the operation of the stroke in the fuel shut-off condition. Maintaining the cylinder valve operation may further include opening an exhaust valve late in the power stroke or earlier in the exhaust stroke and closing the exhaust valve late in the exhaust stroke or early in the intake stroke. In this way, air may still be pumped through the cylinder while fuel is not injected into the cylinder and combustion is discontinued.

In some examples, the opening of the intake and/or exhaust valves may be adjusted to reduce air flow to the catalyst to decrease an oxidation saturation of the catalyst. Furthermore, the opening on the intake and exhaust valves may also be adjusted to increase the temperature of the exhausted air. For example, adjusting the intake valve timing to maximize an effective compression ratio (e.g., closing the intake valve near BDC of the intake stroke) and adjusting the exhaust valve timing to minimize the expansion ratio (e.g., opening the exhaust valve father from BDC) may increase the temperature of the exhaust gases due to the increased effective compression ratio and decreased effective expansion ratio.

At 324, method 300 may optionally include closing or maintaining closed a TJI system valve. The TJI system valve (also referred to as simply "the valve") may be valve 212 shown in FIG. 2A-2C, which is used for regulating the flow and/or supply of air and fuel from a compressor or pump (e.g., compressor 190) to ports of the TJI system (e.g., ports 210a, 210b, and 210n). For example, if the valve is open and a solenoid valve, the controller may de-energize the valve causing the valve to close. In some examples, the valve may be a check valve, which may not be controlled by the controller. In such examples, the check valve may close due to a low pressure upstream of the check valve. By closing the valve or maintaining the valve closed, air, fuel, gases, etc. may not flow from upstream of the valve to downstream of the valve, and air, fuel, gases, etc. may not flow from downstream of the valve to upstream of the system valve. In this way, when transferring hot gases from one cylinder to another through the TJI system, the hot gases may flow into the intended cylinder instead of flowing upstream of the TJI system valve.

At 326, method 300 includes increasing an unburned exhaust gas flow temperature by transferring a hot, compressed charge between cylinders via the pre-chamber injectors. Within certain strokes of the four stroke engine cycle, as will be elaborated below, a first pre-chamber injector may open to allow hot gases from a first cylinder in the late compression and/or early expansion stroke to flow through the open pre-chamber injector and to the common delivery passage. From the common delivery passage, the hot gases may flow to a second pre-chamber injector that is open, and the hot gases may flow into a second cylinder through the pre-chamber injector.

Increasing the unburned exhaust gas temperature may include opening the first pre-chamber injector of the first cylinder in the compression and/or early expansion stroke and opening the second pre-chamber injector of the second cylinder in the late expansion and/or exhaust stroke, as indicated at 328 of method 300. The first pre-chamber injector and the second pre-chamber injector may be actuated into an open position by the controller simultaneously or sequentially. As an example, the first and second pre-chamber injectors may open simultaneously or near simultaneously such that the opening of the first and second pre-chamber injectors may at least partially overlap or fully overlap. As another example, the first pre-chamber injector may be opened before the second pre-chamber injector to allow the unburned, hot, compressed charge to enter the common delivery passage before the second pre-chamber injector opens. The second pre-chamber injector may then open while the first pre-chamber injector is still open such that the opening of the first and second injectors may partially overlap. As a further example, the first pre-chamber injector may open and close before the second pre-chamber injector opens such that the opening of the first and second injectors do not overlap in time.

Opening the first pre-chamber injector in the late compression stroke or early expansion stroke allows for gases that have increased in temperature by the piston in the first cylinder compressing the gases to flow from the first cylinder through the pre-chamber injector, into the common delivery passage (or rail), and to the second cylinder, which is in the late expansion and/or exhaust stroke, through the open second pre-chamber injector. The flow of gases from the first cylinder to the second cylinder may be facilitated by a pressure gradient caused by the first cylinder being in the late compression and/or early expansion stroke (higher pressure) and the second cylinder being in the late expansion and/or exhaust stroke (lower pressure). In some examples, the late compression stroke may be a range of 90 CAD to 180 CAD after BDC of the compression stroke. In other examples, the late compression stroke may be a range of 100 CAD to 180 CAD after BDC of the compression stroke or a range of 110 CAD to 180 CAD after BDC of the compression stroke. As a further example, the early expansion stroke may be a range of 0 to 45 CAD after TDC of the expansion stroke or a range of 0 to 90 CAD after TDC of the expansion stroke. As yet another example, the late expansion stroke may be a range of 90 to 180 CAD or a range of 100 to 180 CAD after TDC of the expansion stroke. By increasing the temperature of the gases within the late expansion and/or early exhaust stroke by transferring the hot, compressed gases, the gases exhausted into an exhaust system (e.g., exhaust manifold 48 shown in FIG. 1) through exhaust valves of the second cylinder are increased in temperature such that the temperature of the catalyst may not be decreased during the fuel shut-off operation. Additionally, opening the pre-chamber injectors of the first and second cylinder during the late compression and/or early expansion stroke and during the late expansion and/or exhaust stroke, respectively, is further elaborated below in FIG. 5.

Transferring unburned exhaust gas may further include opening the first pre-chamber injector of the first cylinder in the compression and/or early expansion stroke and opening the second pre-chamber injector of the second cylinder in the intake stroke, as indicated by 330 of method 300. The first pre-chamber injector and the second pre-chamber injector may be actuated into an open position by the controller simultaneously or sequentially, as described above at 328 of method 300. Opening the first pre-chamber injector in the compression stroke and/or early expansion stroke allows for gases that have increased in temperature by the piston of the first cylinder compressing the gases to flow from the first cylinder, into a pre-chamber fluidically coupled to the first cylinder, through the open first pre-chamber injector, into the common delivery passage, and through the second pre-chamber injector to the second cylinder, which is in the intake stroke. The flow of gases may be facilitated by a pressure gradient. For example, the first cylinder may be have a high pressure due to the first cylinder being in the late compression and/or early expansion stroke while the common delivery passage is at a lower pressure, allowing gases from the first cylinder to flow into the common delivery passage. The second cylinder has a lower pressure than the common delivery passage during the intake stroke, allowing the gases in the common delivery passage to flow into the second cylinder. By transferring a hot, compressed charge of gas to the second cylinder during the intake stroke of the second cylinder, the temperature of the intake gases may be increased such that when the gases reach the exhaust system the gases may not decrease the temperature of the catalyst. Additionally, by recirculating the gases within the TJI system, less oxygen may reach the catalyst, decreasing the oxidation saturation of the catalyst during the fuel shut-off event. In this way, when the fuel shut-off condition ends, the catalyst may efficiently treat emissions since the temperature of the catalyst is above its light-off temperature and the catalyst may not be saturated with oxygen, and a fuel economy of the vehicle may be further increased as the engine may not have to be operated rich to balance an oxygen saturated catalyst. Furthermore, transferring gases from the cylinder in the compression and/or early expansion stroke to a cylinder in the intake stroke is further elaborated below in FIG. 6.

The engine may operate the TJI system such that gases transferred from the first cylinder may go into the second cylinder while the second cylinder is either a cylinder in the late expansion and/or exhaust stroke, in the intake stroke, or is in either the intake or exhaust stroke. An example of operating the TJI system of transferring to the second cylinder in either the intake of exhaust stroke is shown in FIG. 7.

At 332, the method determines if the fuel shut-off condition is still present or desired. For example, the fuel shut-off conditions may include the conditions described above at 304. For example, the vehicle operator may perform a "tip-in" where the accelerator pedal goes from an undepressed (or less depressed) position to further depressed position, indicating a rapid increase in the torque demand. Additionally or alternatively, the controller may determine that the torque demand of the engine is greater than the current torque output of the engine based on the accelerator pedal position and the brake pedal position, and combustion may be requested in order to increase the current torque output of the engine to meet the torque demand. In still other examples, additionally or alternatively, the fuel shut-off event may no longer be desired in response to the engine speed decreasing to the pre-determined non-zero threshold engine speed below which inadvertent engine shutdown may occur.

If the fuel shut-off condition is determined to be present at 332, the method returns to 326 of method 300, and the TJI system may increase the temperature of unburned exhaust gas by transferring hot compressed charges between the cylinders through the pre-chamber injectors.

If at 332 the fuel shut-off condition is not present, method 300 proceeds to 306 to determine a desired engine AFR, as described above. Based on the engine AFR and the cylinder air charge, further described above, fuel is injected into the cylinders at 308 of method 300. At 310 of method 300, the TJI system is operated in the ignition mode, which may include enabling a pre-chamber fuel supply at 312 of method 300, injecting air-fuel mixture into the pre-chamber during compressing stroke at 314 of method 300, actuating the pre-chamber spark plug at a spark timing for desired ignition timing at 316 of method 300, and optionally opening or maintaining open the TJI system valve at 317 of method 300, all of which are described above. Method 300 may then end.

In this way, the TJI system may be used to increase the temperature of unburned exhaust gases and recirculate gases such that the temperature of a catalyst may not decrease to an inefficient temperature nor may the catalyst become oxygen saturated during a fuel shut-off event. Hot gases in a cylinder within the late compression and/or early expansion stroke may be transferred through the TJI system to another cylinder within the late expansion and/or exhaust stroke, increasing the temperature of the exhaust gases. Additionally or alternatively, hot gases from a cylinder within the late compression and/or early expansion stroke may be transferred through the TJI system to another cylinder within the intake stroke, recirculating the gases to increase the intake gas temperature (therefore increasing the exhaust gas temperature) and decrease the oxygen saturation of the catalyst due to reduced exhaust flow. Furthermore, when the fuel shut-off condition is not present, the TJI system may be used to provide ignition to the cylinders and therefore may be used for multiple engine operations.

Turning now to FIGS. 4-7, example timing charts for operating a TJI system in different modes are shown. For example, the TJI system may be TJI system 200 described in FIGS. 2A-2C. For each timing chart, a valve position is shown in plot 404, a pre-chamber fuel injector is shown in plot 406, a pre-chamber injector for cylinder 1 is shown in plot 408, a pre-chamber injector for cylinder 2 is shown in plot 410, a pre-chamber injector for cylinder 3 is shown in plot 412, a pre-chamber injector for cylinder 4 is shown in plot 414, and a pre-chamber spark plug for cylinders 1, 2, 3, and 4 are shown in plots 418, 420, 422, and 424 respectively. FIGS. 4-7 have the same parameters, and as such, the parameters are labeled the same within FIGS. 4-7.

For all of the above, the horizontal axis represents engine position (e.g., in crank angle degrees), with the crank angle degrees (CAD) increasing from left to right. The vertical axis represents each labeled parameter. For each of plots 404, 408, 410, 412, and 414 the vertical axis indicates whether the labeled parameter is open or closed. For example, when the valve (e.g., valve 212 shown in FIGS. 2A-2C) of plot 404 is closed, air from a pump (e.g., compressor 190 shown in FIGS. 1-2C) and fuel from the pre-chamber fuel injector (e.g., pre-chamber fuel injector 196 shown in FIGS. 1-2C) may not flow upstream of the valve to downstream of the valve where the pre-chamber injectors (e.g., pre-chamber injectors 94a, 94b, and 94n) are located. As another example, when the pre-chamber injectors (plots 408, 410, 412, and 414) are open, the pre-chamber injectors fluidically couple pre-chambers (which are fluidically coupled to the cylinders) to a common delivery passage (e.g., common delivery passage 208 shown in FIGS. 2A-2C). For plot 406, the vertical axis indicates whether the pre-chamber fuel injector is active or deactivated. For example, when the pre-chamber fuel injector is active, fuel may be injected into an air intake passage upstream of the valve, which may flow downstream of the valve to the common delivery passage.

Further, relative engine strokes are shown in map 402 for cylinder 1, cylinder 2, cylinder 3, and cylinder 4 as indicated at the top of timing chart 400. For example, the interval from 0 CAD to 180 CAD corresponds to the compression stroke for cylinder 1, the expansion stroke for cylinder 2, the intake stroke for cylinder 3, and the exhaust stroke for cylinder 4. For the interval from 180 CAD to 360 CAD, cylinder 1 is in the expansion stroke, cylinder 2 is in the exhaust stroke, cylinder 3 is in the compression stroke, and cylinder 4 is in the intake stroke. The interval from 360 CAD to 540 CAD corresponds to the exhaust stroke for cylinder 1, the intake stroke for cylinder 2, the expansion stroke for cylinder 3, and the compression stroke for cylinder 4. For the interval from 540 CAD to 720 CAD, cylinder 1 is in the intake stroke, cylinder 2 is in the compression stroke, cylinder 3 in the exhaust stroke, and cylinder 4 is in the expansion stroke. While only four cylinders are shown in the timing charts of FIGS. 4-7, in some examples there may be more or less cylinders.

Figure 4:
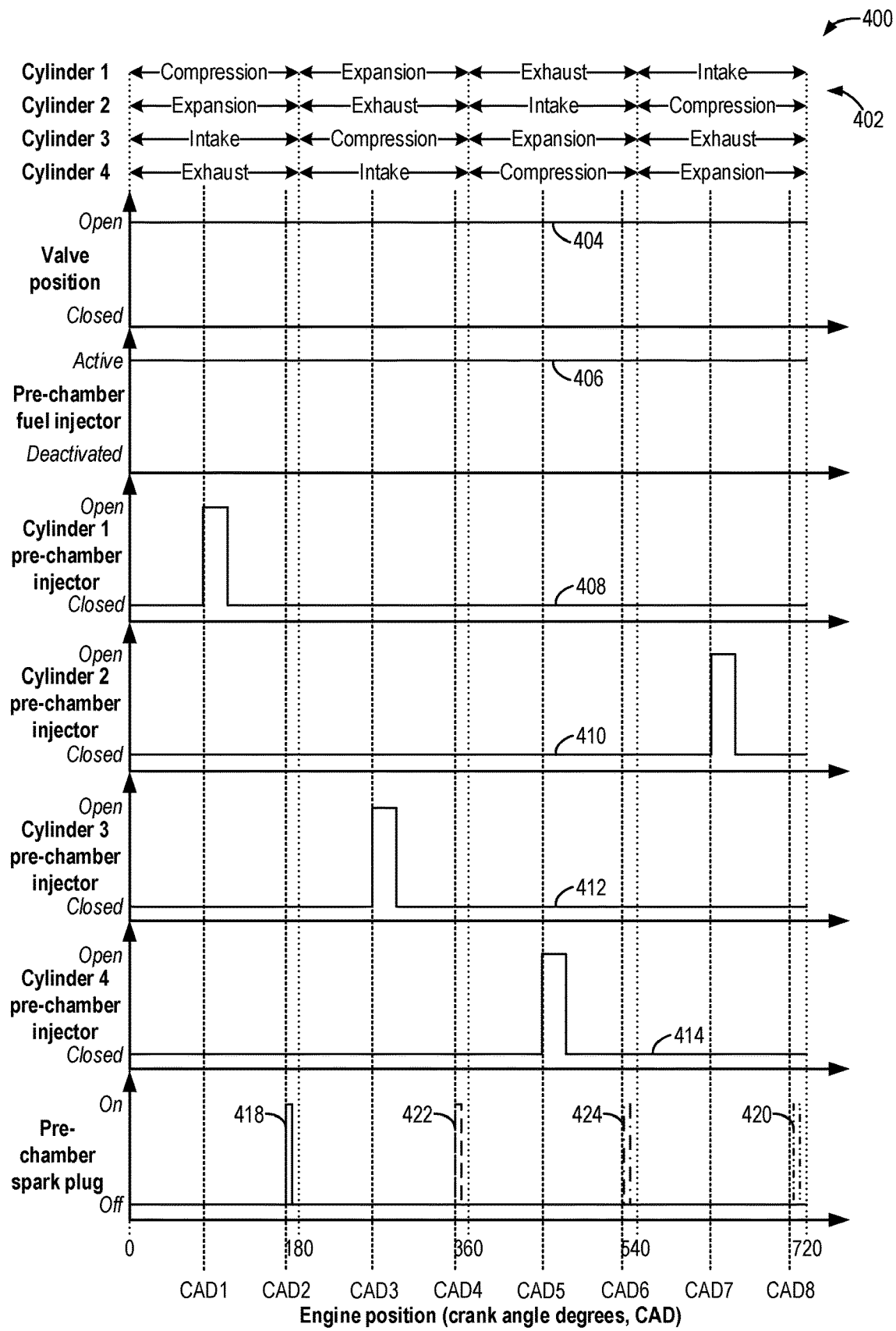
FIG. 4 shows an example timing chart of operating a turbulent jet ignition system in an ignition mode.

Starting with FIG. 4, an example timing chart 400 shows the TJI system operating in an ignition mode. The ignition mode may be similar to the ignition mode described within FIG. 3, and as such, an engine (e.g., engine 10 shown in FIG. 1) of a vehicle (e.g., vehicle 5 shown in FIG. 1) may operate in the ignition mode when a fuel shut-off condition is not present. While in the ignition mode, the valve position (plot 404) is maintained in an open position throughout the engine cycle. With the valve in an open position, air and fuel injected into an air intake passage (e.g., air intake passage 202 shown in FIGS. 2A-2C) from upstream of the valve may flow through the valve and into the common delivery passage. The pre-chamber fuel injector (plot 406) is also maintained active throughout the engine cycle. Thus, the pre-chamber fuel injector may inject fuel into the air intake passage, which may flow through the open valve, into the common delivery passage, and to the pre-chamber injectors. In some examples, the pre-chamber fuel injector may cycle between active and deactivated throughout the four-stroke cycle such that a desired amount of fuel may be supplied to the TJI system. When the pre-chamber injectors open, the air and fuel may flow into the pre-chambers. In this way, by maintaining the valve in the open position and maintaining the pre-chamber fuel injector active, air and fuel may be delivered to the pre-chamber injectors to be used for combustion within the pre-chambers.

While operating in the ignition mode, the pre-chamber injectors open within the compression stroke of their respective cylinder. For example, the cylinder 1 pre-chamber injector (plot 408) opens at CAD1, which near the center (e.g., approximately in a range from 80 to 100 CAD after BDC and before TDC) of the compression stroke of cylinder 1. When the cylinder 1 pre-chamber injector is open, air and fuel may enter the pre-chamber of the first cylinder from the common delivery passage. After air and fuel has entered the pre-chamber of the first cylinder, the cylinder 1 pre-chamber injector may close approximately 30 CAD after CAD1, for example. As another example, the cylinder 1 pre-chamber may close within a range of 20 to 30 CAD or 30 to 40 CAD after CAD1. Near TDC of the compression stroke of cylinder 1, the cylinder 1 pre-chamber spark plug (plot 418) actuates on with a spark advance signal from a controller (e.g., controller 12 shown in FIG. 1) at CAD2. The spark produced by the cylinder 1 pre-chamber spark plug ignites the air and fuel within the pre-chamber of cylinder 1, causing jets of flames to flow through orifices (e.g., plurality of openings 142 shown in FIG. 1) on the pre-chamber fluidically coupling the pre-chamber to cylinder 1. The jets of flames may then initiate combustion of air and fuel within cylinder 1 to be used to power the vehicle.

Cylinder 2, 3, and 4 pre-chamber injectors (plots 410, 412, and 414 respectively) may be operated in a similar way as the cylinder 1 pre-chamber injector. For example, each of the pre-chamber injectors may open during the compression stroke of their respective cylinder. As shown, cylinder 2 pre-chamber injector opens at CAD7, cylinder 3 pre-chamber injector opens at CAD3, and cylinder 4 pre-chamber injector opens at CAD5, all of which open approximately at the center of the compression stroke of the respective cylinder. The pre-chamber injectors of cylinder 2, 3, and 4 may then be moved to a closed position 20 to 30 CAD or 30 to 40 CAD after the pre-chamber injectors are initially opened. After air and fuel has been introduced into each cylinder through their respective pre-chamber, the pre-chamber spark plug of each cylinder may actuate on near TDC of the compression stroke for each cylinder and ignite the air and fuel injected into the pre-chambers. For example, the cylinder 2 pre-chamber spark plug (plot 420) actuates on at CAD5, the cylinder 3 pre-chamber spark plug (plot 422) actuates on at CAD4, and the cylinder 4 pre-chamber spark plug (plot 424) actuates on at CAD6. The combustion of air and fuel within the pre-chambers may then send jets of flames into their respective cylinder to combust air and fuel within the cylinder. In this way, the TJI system operating in the ignition mode may be used to create combustion within the cylinders and power the vehicle.

Figure 5:
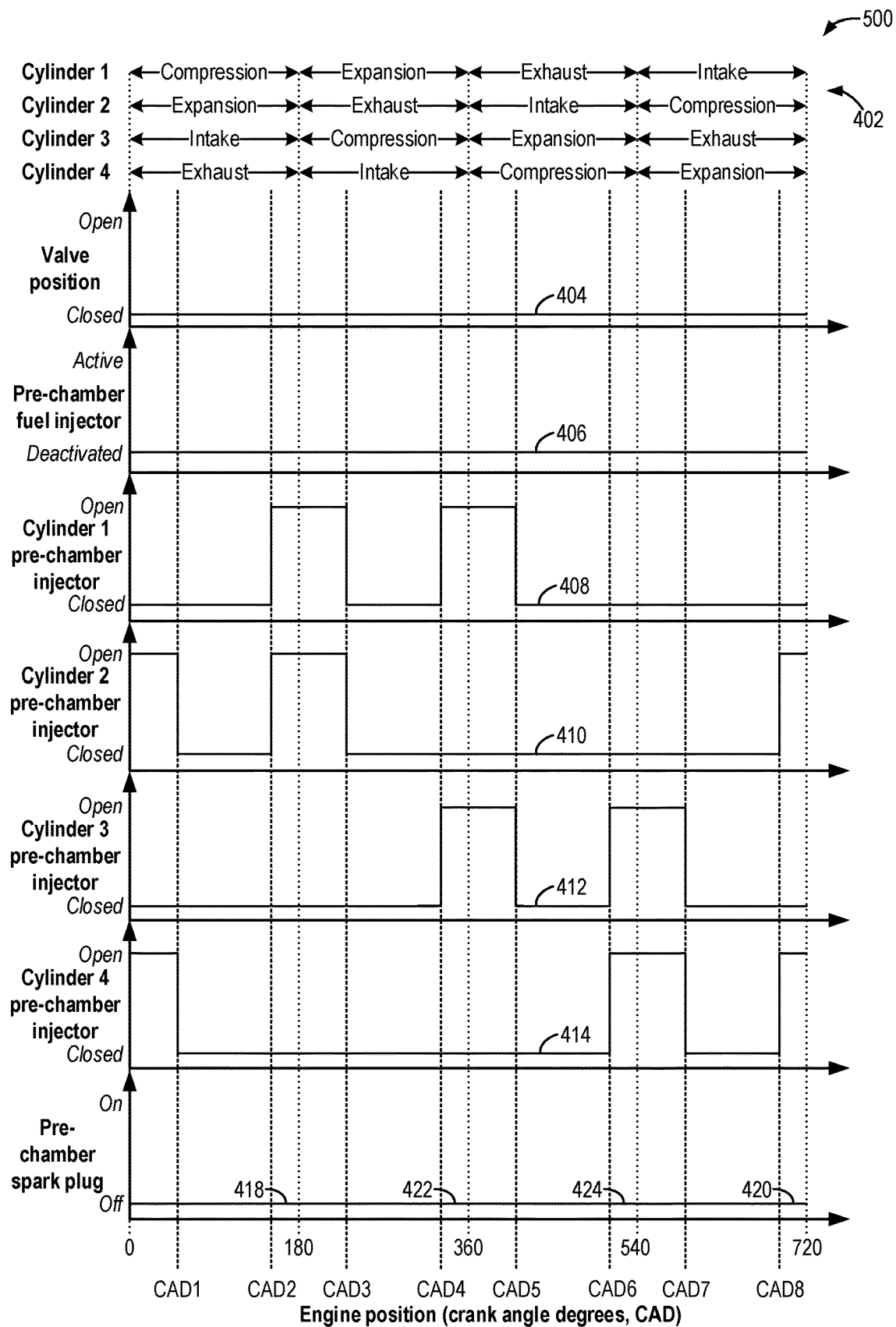
FIG. 5 shows a first example timing chart of operating a turbulent jet ignition system in a gas transfer mode.

Turning now to FIG. 5, an exemplary timing chart 500 shows the TJI system operating in a first gas transfer mode. The first gas transfer mode is one example of operating the TJI system for maintaining a temperature of a catalyst through transferring hot gases between cylinders. For example, the catalyst may be the emission control device 178 shown in FIG. 1. Operating in the first gas transfer mode transfers gases from a cylinder within the late compression and/or early expansion stroke to a cylinder within the late expansion and/or early exhaust stroke. Further, the TJI system operates in the first gas transfer mode when a fuel shut-off condition is present and combustion within the pre-chamber is not desired, and as such, the pre-chamber fuel injector (plot 406) is deactivated and the pre-chamber spark plugs for cylinder 1 (plot 418), cylinder 2 (plot 420), cylinder 3 (plot 422), and cylinder 4 (plot 424) are maintained off throughout the four stroke engine cycle. To prevent the gases that are transferred between cylinders from flowing upstream of the valve, the valve position (plot 404) is maintained closed while the engine is operating in the first gas transfer mode.

The cylinder 1 pre-chamber injector (plot 408) opens at CAD2, which is late (e.g., near TDC) in the compression stroke of cylinder 1. Also at CAD2, cylinder 2 is late (e.g., near BDC) in the expansion stroke, and the cylinder 2 pre-chamber injector (plot 410) is opened. Gases within cylinder 1 that have been compressed and heated through pressure during the compression stroke flow out of cylinder 1 through the cylinder 1 pre-chamber injector and into the common delivery passage. From the common delivery passage the heated gases may flow through the open cylinder 2 pre-chamber injector and into cylinder 2 due to the pressure difference between the common delivery passage and cylinder 2. The cylinder 1 pre-chamber injector remains open until early in the expansion stroke of cylinder 1 at CAD3. Similarly, the cylinder 2 pre-chamber injector remains open until CAD3, at which time cylinder 2 is in the early exhaust stroke (e.g., near BDC of the exhaust stroke). By recirculating the gases from cylinder 1 to cylinder 2, the temperature of exhaust gases leaving cylinder 2 through open exhaust valve(s) (e.g., exhaust valve 8 shown in FIG. 1) may be increased such that the catalyst temperature may not decrease below an efficient temperature (e.g., below a light-off temperature).

Hot, unburnt gases may be transferred between cylinders again at CAD4 when the cylinder 3 (plot 412) and cylinder 1 (plot 408) pre-chamber injectors are opened. Due to cylinder 3 being near TDC of the compression stroke, gases within the cylinder have been compressed and heated by pressure. The hot compressed air may leave cylinder 3 through the open cylinder 3 pre-chamber injector to enter the common delivery passage and flow into cylinder 1, which is in the late expansion stroke (e.g., near BDC of the expansion stroke), through the open cylinder 1 pre-chamber injector to increase to temperature of exhaust gases leaving the cylinder so that the temperature of the catalyst may not decrease during the fuel shut-off event. At CAD5, both cylinder 1 and cylinder 3 pre-chamber injectors may close, discontinuing the transfer of hot gases from cylinder 3 to cylinder 1.

At CAD6, the cylinder 4 (plot 414) and cylinder 3 (plot 412) pre-chamber injectors open, and hot, unburnt gases transfers from the higher pressures of cylinder 4, which is in the late compression stroke, to the lower pressures of cylinder 3, which is in the late expansion stroke. Cylinder 4 and cylinder 3 pre-chamber injectors remain open until CAD7, which is early (e.g., neat TDC) expansion stroke for cylinder 4 and early (e.g., near BDC) exhaust stroke for cylinder 3, where both cylinder 4 and cylinder 3 pre-chambers close, stopping the flow between the two cylinders.

At CAD8, the pre-chamber injectors for cylinder 2 (within the late compression stroke) and cylinder 4 (within the late expansion stroke) open (plots 410 and 414 respectively), allowing compressed gases from cylinder 2 to flow into the common delivery passage and to cylinder 4 to increase the temperature of exhaust gases. The transfer of gases continues until CAD1 where cylinder 2 and cylinder 4 pre-chamber injectors close.

Although in FIG. 5 the pre-chamber injectors are shown to open simultaneously, the pre-chamber injectors may open sequentially. For example, at CAD2 where the cylinder 1 pre-chamber injector and cylinder 2 pre-chamber injector open simultaneously or near simultaneously, the cylinder 1 pre-chamber injector may open before the cylinder 2 pre-chamber opens. The cylinder 1 pre-chamber and cylinder 2 pre-chamber may have some time overlap where they are both open. In other examples, the cylinder 1 pre-chamber injector may open and close before the cylinder 2 pre-chamber opens. Furthermore, FIGS. 6 and 7 show gas transfer modes where pre-chamber injectors are open simultaneously or near simultaneously; however, it may be appreciated that the pre-chamber injectors shown in FIGS. 6 and 7 may also open sequentially as just described.

Figure 6:
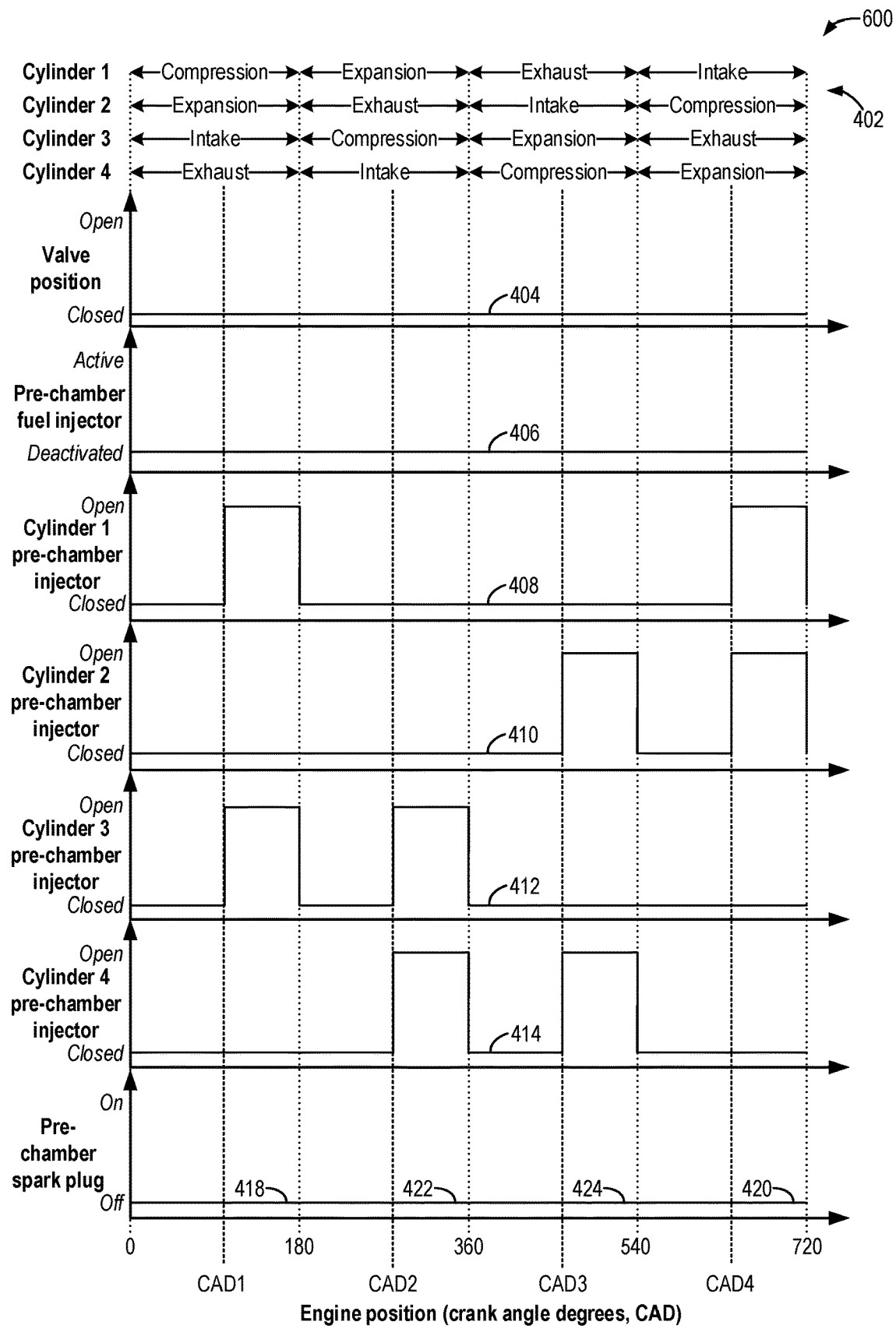
FIG. 6 shows a second example timing chart of operating a turbulent jet ignition system in a gas transfer mode.

Moving now to FIG. 6, an exemplary timing chart 600 shows the TJI system operating in a second gas transfer mode. The second gas transfer mode is another example of operating the TJI system for maintaining a temperature of the catalyst through transferring hot gases between cylinders during a fuel shut-off condition. While operating in the second gas transfer mode, gases are transferred from a cylinder within the late compression and/or early expansion stroke (similar to the first gas transfer mode) to a cylinder within the intake stroke. Further, since the TJI system operates in the second gas transfer mode when a fuel shut-off condition is present and combustion within the pre-chamber is not desired, the pre-chamber fuel injector (plot 406) is deactivated and the pre-chamber spark plugs for cylinder 1 (plot 418), cylinder 2 (plot 420), cylinder 3 (plot 422), and cylinder 4 (plot 424) are maintained off throughout the four stroke engine cycle. To prevent the gases that are transferred between cylinders from flowing upstream of the valve, the valve position (plot 404) is maintained closed while the engine is operating in the second gas transfer mode.

At CAD1, the cylinder 1 pre-chamber injector (plot 408) opens, which is late (e.g., near TDC) in the compression stroke of cylinder 1. Due to cylinder 3 being in the late (e.g., near BDC) intake stroke at CAD1, the cylinder 3 pre-chamber injector (plot 412) is also opened. Gases within cylinder 1 that have been compressed and heated through the pressure during the compression stroke form a hot, compressed charge that flows out of cylinder 1 (higher pressure gradient) through the cylinder 1 pre-chamber injector and into the common delivery passage (lower pressure gradient). From the common delivery passage the heated gases may flow through the open cylinder 3 pre-chamber injector and into cylinder 3 due to the pressure difference between cylinder 3 (lower pressure) and the common delivery passage (higher pressure). The cylinder 1 pre-chamber injector remains open until TDC of the compression stroke (e.g., around 180 CAD) of cylinder 1. Similarly, the cylinder 2 pre-chamber injector remains open until BDC of the intake stroke of cylinder 3 (e.g., also around 180 CAD). In other examples, the cylinder 1 and cylinder 3 pre-chamber injectors may close in a range from 170 to 180 CAD or in a range from 180 to 190 CAD. By recirculating the gases from cylinder 1 to cylinder 3, the temperature of intake air and gases entering cylinder 3 may be increased such that in turn exhaust gas temperature is also increased. Additionally, the recirculation of gases decreases an amount of oxygen reaching the catalyst. In this way, the catalyst temperature may be maintained above the light-off temperature of the catalyst, and the catalyst may not become saturated with oxygen during a fuel shut-off condition. The catalyst may then be able to efficiently treat emissions once the combustion is resumed since it is at an efficient temperature and efficient balance of oxidants and reductants in the catalyst.

At CAD2, cylinder 3 pre-chamber injector (plot 412) and cylinder 4 pre-chamber injector (plot 414) both open since cylinder 3 is within the compression stroke and cylinder 4 is in the intake stroke. A hot, compressed charge created in cylinder 3 by high pressures flows from cylinder 3, through the open cylinder 3 pre-chamber injector into the common delivery passage, and through the open cylinder 4 pre-chamber injector into cylinder 4, increasing the temperature of the intake gas and reducing flow of oxygen to the catalyst. The cylinder 3 and cylinder 4 pre-chamber injectors may then close at around 360 CAD (e.g., BDC of the intake stroke for cylinder 4 and TDC of the compression stroke for cylinder 3). At CAD3, the processes of transferring the hot, compressed gases from a cylinder in the compression stroke to a cylinder in the intake stroke is repeated with cylinder 2 (e.g., the cylinder in the intake stroke) and cylinder 4 (e.g., the cylinder in the compression stroke). The cylinder 2 and cylinder 4 pre-chamber injectors (plots 410 and 414 respectively) are opened at CAD3, a hot compressed gases transfers from cylinder 4 to cylinder 2, and then the pre-chamber injectors of cylinder 2 and cylinder 4 are closed at approximately 540 CAD (e.g., near TDC of the compression stroke for cylinder 4 and near BDC of the intake stroke for cylinder 2). The gas transfer processes is repeated again at CAD4 with cylinder 2 providing the hot gas to transfer because cylinder 2 is within the compression stroke while cylinder 1 receives the transferred hot gas because cylinder 1 is within the intake stroke. The pre-chamber injectors for cylinder 1 and cylinder 2 (plot 408 and 410 respectively) open at CAD4, hot, unburned gases transfer from cylinder 2 to cylinder 1 through the open pre-chamber injectors and common delivery passage, and then the pre-chamber injectors close at approximately 720 CAD.

Continuing now to FIG. 7, an exemplary timing chart 700 shows the TJI system operating in a third gas transfer mode. The third gas transfer mode is another example of operating the TJI system for maintaining a temperature of the catalyst through transferring hot gases between cylinders during a fuel shut-off condition. The third gas transfer mode may be a combination of the first and second gases transfer modes. For example, a pre-chamber injector connected to a cylinder in the late compression stroke and/or early expansion stroke is opened and gas may transfer to a cylinder in the intake stroke and to a cylinder in the late expansion and/or early exhaust stroke. Further, since the TJI system operates in the third gas transfer mode when a fuel shut-off condition is present and combustion within the pre-chamber is not desired, the pre-chamber fuel injector (plot 406) is deactivated and the pre-chamber spark plugs for cylinder 1 (plot 418), cylinder 2 (plot 420), cylinder 3 (plot 422), and cylinder 4 (plot 424) are maintained off throughout the four stroke engine cycle. To prevent the gases that are transferred between cylinders from flowing upstream of the valve, the valve position (plot 404) is maintained closed while the engine is operating in the second gas transfer mode.

At CAD2, cylinder 1 is in the mid compression stroke (e.g., approximately halfway between BDC and TDC). Air and gas within cylinder 1 are compressed to form a hot charge of gases that, when the cylinder 1 pre-chamber injector (plot 408) opens at CAD2, leave the cylinder 1 through the cylinder 1 pre-chamber injector and flows into the common delivery passage. Also at CAD2, cylinder 3 is mid intake stroke (e.g., approximately halfway between TDC and BDC) and air is introduced to cylinder 3 through intake valve(s) (e.g., intake valve 4 shown in FIG. 1). To increase the temperature of the intake air, at CAD2 the cylinder 3 pre-chamber injector (plot 412) opens, allowing the hot, compressed charge of gases that flows into the common delivery passage from cylinder 1 to enter the lower pressure cylinder 3 through the open cylinder 3 pre-chamber injector. While both the cylinder 1 pre-chamber injector and cylinder 3 pre-chamber injector are open, the cylinder 2 pre-chamber injector (plot 410) opens once cylinder 2 reaches the late expansion stroke (e.g., near BDC of the expansion stroke). The hot gases of cylinder 1 may flow into both cylinder 2 and cylinder 3 through their respective pre-chamber injectors. At around 180 CAD (e.g., BDC of the intake stroke for cylinder 3), the cylinder 3 pre-chamber injector closes, fluidically decoupling cylinder 3 from the common delivery passage. As such, gas from cylinder 1 may no longer flow to cylinder 3, instead may only flow to cylinder 2. The cylinder 1 and cylinder 2 pre-chamber injectors remain open, allowing hot gases to flow from cylinder 1 to cylinder 2 until CAD3 (e.g., early expansion stroke for cylinder 1 and early exhaust stroke for cylinder 2), at which time both cylinder 1 and cylinder 2 pre-chamber injectors close.

At CAD4, the process of transferring hot, unburnt gas from one cylinder to one or more cylinders is repeated with cylinder 1, cylinder 3, and cylinder 4. Both cylinder 3 and cylinder 4 pre-chamber injectors (plots 412 and 414 respectively) open at CAD4. With cylinder 3 within the compression stroke, the compressed gases flow from cylinder 3, through the open cylinder 3 pre-chamber injector, to the common delivery passage and into cylinder 4 through the open cylinder 4 pre-chamber injector. Since cylinder 4 is within the intake stroke at CAD4, the hot gases flowing into it combine with intake air flowing from an intake passage to increase the temperature of gases within the engine. The cylinder 1 pre-chamber injector opens (plot 408) near BDC of the expansion stroke of cylinder 1 while both the cylinder 3 and cylinder 4 pre-chamber injectors are open, causing a portion of the hot gases that flow from cylinder 3 to enter into cylinder 1. At BDC of the intake stroke (e.g., approximately around 360 CAD) for cylinder 4, the cylinder 4 pre-chamber injector may close, discontinuing gas flow into cylinder 4 from the common delivery passage. The cylinder 1 and cylinder 3 pre-chamber injectors remain open, allowing hot gases to flow into cylinder 1 from cylinder 3, until CAD5, at which time both cylinder 1 and cylinder 3 pre-chamber injectors close.

At CAD6, the cylinder 2 pre-chamber injector (plot 410) and cylinder 4 pre-chamber injector (plot 414) open, allowing hot, unburnt gases to flow from cylinder 4, through the common delivery passage, to cylinder 2, which is in the intake stroke, increasing the temperature of intake air within cylinder 2. The cylinder 3 pre-chamber injector (plot 412) opens near the end (e.g., near BDC) of the expansion stroke of cylinder 3, causing a portion of the hot gases flowing from cylinder 4 to enter cylinder 3, increasing the temperature of exhaust gases. At around 540 CAD, the cylinder 2 pre-chamber injector closes as cylinder 2 reaches the end of the intake stroke (e.g., BDC of the intake stroke). The cylinder 3 and cylinder 4 pre-chamber injectors remain open, transferring gas from cylinder 4 to cylinder 3, until CAD7 where both cylinder 3 and cylinder 4 pre-chamber injectors close.

At CAD8, the cylinder 2 pre-chamber injector opens (plot 410) and the cylinder 1 pre-chamber injector opens (plot 408), thus hot, compressed, unburnt gases from cylinder 2, which is within the compression stroke, may flow to cylinder 1, which is within the intake stroke, increasing the temperature of intake air entering cylinder 1. Near BDC of the expansion stroke for cylinder 4, the cylinder 4 pre-chamber injector opens (plot 414), causing a portion of the compressed, hot gases flowing from cylinder 2 to flow into cylinder 4. Cylinder 1 pre-chamber injector closes approximately at 720 CAD (e.g., near BDC of the intake stroke) while the cylinder 4 and cylinder 2 pre-chamber injectors remain open, transferring hot gases from cylinder 2 to cylinder 4, until the cylinder 4 and cylinder 2 pre-chamber injectors close at CAD1 of the next cycle.

Moving now to FIG. 8, an exemplary timeline 800 for operating a TJI system is shown. For example the TJI system may be TJI system 200 describe in FIGS. 2A-2C. As another example, the TJI system may be a part of an engine in a vehicle such as engine 10 in vehicle 5, both shown in FIG. 1. A pedal position is shown in plot 802, a revolutions per minute (RPM) is shown in plot 804, a vehicle speed is shown in plot 806, a catalyst temperature is shown in plot 808, a potential catalyst temperature is shown in dashed plot 810, a temperature threshold is shown by dashed line 811, a TJI system mode is shown in plot 812, a pre-chamber fuel injector is shown in plot 814, and a valve position is shown in plot 816.

For all of the above, the horizontal axis represents time, with time increasing along the horizontal axis from left to right. Vertical lines at times t0-t6 represent times of interest during the sequence. The plots in FIG. 8 are time aligned and occur at the same time. The vertical axis represents each labeled parameter. For plots 802, 804, 806, 808, and 810 the labeled parameter increases up the vertical axis from bottom to top. For example, in plot 802 the pedal position may be increasingly pressed as the vertical axis increases. For plot 812, the vertical axis represents whether the TJI system is in a gas transfer mode or an ignition mode. For example, the ignition mode may be the ignition mode described in FIG. 4 where the TJI system and pre-chambers are used to provide ignition to the cylinders. As another example, the gas transfer mode may be the first, second, or third gas transfer modes described in FIGS. 5, 6, and 7 respectively. For plot 814, the vertical axis indicates whether the pre-chamber fuel injector (e.g., pre-chamber fuel injector 196 shown in FIGS. 2A-2C) is active or deactivated. For example, when the pre-chamber fuel injector is active, fuel may be injected into an air passage (e.g., air intake passage 202 shown in FIGS. 2A-2C) upstream of the valve (e.g., valve 212 shown in FIGS. 2A-2C), which may flow downstream of the valve to the common delivery passage (e.g., common delivery passage 208 shown in FIGS. 2A-2C). For plot 816, the vertical axis indicates the position of the valve. For example, when the valve is closed, air and fuel may not flow from a compressor (e.g., compressor 190 shown in FIGS. 2A-2C) upstream of the valve to downstream of the valve where pre-chamber injectors (e.g., pre-chamber injectors 94a, 94b, and 94n) are located.

Additionally, the temperature threshold, shown by dashed line 811, may be a non-zero number stored in a memory of a controller (e.g., controller 12 shown in FIG. 1). The temperature threshold may correspond to a light-off temperature of the catalyst. For example, if the catalyst temperature is below the light-off temperature, the catalyst may not be able to perform efficiently to treat emissions from the engine.

From time t0 to t1, the vehicle is maintaining a constant speed (plot 806), the pedal does not change position (plot 802), and the RPM does not fluctuate (plot 804). Since neither a tip-out event nor a request for breaking occurs, a fuel shut-off condition is not present in the vehicle. As a result the TJI system is operated in the ignition mode (plot 812). While in the ignition mode, the valve (plot 816) is in an open position, allowing air and fuel to flow to pre-chamber injectors. Additionally, the pre-chamber fuel injector is active and injecting fuel to the air intake passage, which may then flow through the valve and to the pre-chamber injectors. When the pre-chamber injectors are actuated (e.g., during the compression stroke for their respective cylinder), the pre-chamber injectors may inject the air and fuel into the pre-chambers for combustion within the pre-chambers and further the cylinders. In this way, the combustion in the cylinders may power the vehicle.

From time t1 to t2, a tip out event occurs as indicated by the decrease in the pedal position shown in plot 802. The RPM (plot 804) and vehicle speed (plot 806) also decrease from time t1 to t2. Since a tip out event is occurring, a fuel shut-off condition is present in the vehicle, and as a result, the TJI system mode (plot 812) changes from the ignition mode to the gas transfer mode. While in the gas transfer mode, the pre-chamber fuel injector (plot 814) is deactivated as fuel is not desired for combustion and the valve (plot 816) is moved to a closed position, fluidically decoupling the air intake passage from the common delivery passage. The gas transfer mode may operate as any of the three example modes described in FIGS. 5-7. For example, when a cylinder is in the late compression and/or early expansion, the pre-chamber injector attached to the pre-chamber of the cylinder may open and allow heated gases to enter the common delivery passage and flow to cylinders with pre-chamber injectors open during low pressure strokes such as the exhaust stroke and/or the intake stroke. In this way, the catalyst temperature (plot 808) is prevented from decreasing below the temperature threshold (dashed line 811). If the TJI system did not operate in the gas transfer mode during the fuel shut-off event, the potential catalyst temperature (dashed plot 810) may have decreased to the temperature threshold, causing a decrease in the efficiency of emission treatment when combustion is resumed.

At time t2, the fuel shut-off event ends, as indicated by the pedal position (plot 802), vehicle speed (plot 806), and RPM (plot 804) no longer decreasing. As a result of the fuel shut-off event ending and a desire for combustion again, the TJI system mode (plot 812) changes operation from the gas transfer mode to the ignition mode. Operating in the ignition mode includes activating the pre-chamber fuel injector (plot 814) so that fuel may be used for combustion in the pre-chambers and cylinders, and the valve position (plot 816) is changed from closed to open so that air and fuel may flow to the common delivery passage. Since the catalyst temperature is above the temperature threshold (dashed line 811), emissions from combustion in the engine may be effectively treated by the catalyst.

From time t2 to t3, no fuel shut-off event occurs, and the TJI system mode (plot 812) remains in the ignition mode. However, at time t3, a second fuel shut-off event occurs, as indicated by the decrease in pedal position (plot 802), RPM (plot 804), and vehicle speed (plot 806). The second fuel shut-off event lasts from time t3 to t4. In response to the second fuel shut-off event, the TJI system mode is changed from the ignition mode to the gas transfer mode. As elaborated above, operating in the gas transfer mode includes deactivating the pre-chamber fuel injector (plot 814), changing the valve position (plot 816) from open to closed, and transferring gases from cylinders in a high pressure stroke (e.g., the late compression and/or early expansion stroke) to cylinders in a low pressure stroke (e.g., late expansion and/or exhaust stroke and intake stroke). In this way, the temperature of the exhaust gases may be increased as compared to when air is pumped through the engine during a fuel shut-off event. The temperature of the catalyst (plot 808) may be prevented from decreasing to the temperature threshold (dashed line 811), as compared to the potential catalyst temperature (dashed plot 810) that decreases to the temperature threshold by time t4.

At time t4, the fuel shut-off event ends, as shown by the pedal position (plot 802), vehicle speed (plot 806), and RPM (plot 804) no longer decreasing. As a result of the second fuel shut-off event ending and a desire for resumed combustion, the TJI system mode (plot 812) changes from the gas transfer mode to the ignition mode, thus activating the pre-chamber fuel injector (plot 814) and changing the valve position (plot 816) from closed to open. Due to the gas transfer mode maintaining the catalyst temperature (plot 808) above the temperature threshold (dashed line 811), emissions from combustion in the engine may be effectively treated by the catalyst. From time t4 to time t5, no fuel shut-off events occur, and the TJI system remains in the ignition mode during this time period.

From time t5 to t6, a third fuel shut-off event occurs, as indicated by the decrease in pedal position (plot 802), RPM (plot 804), and vehicle speed (plot 806). As a response to the third fuel shut-off event starting at time t5, the TJI system mode (plot 812) changes from the ignition mode to the gas transfer mode. To operate in the gas transfer mode, the pre-chamber fuel injector (plot 814) is deactivated, the valve position (plot 816) is moved to a closed position, and gases from cylinders in a high pressure stroke (e.g., the late compression and/or early expansion stroke) are transferred to cylinders in a low pressure stroke (e.g., late expansion and/or exhaust and intake). In this way, the temperature of the catalyst (plot 808) may be prevented from decreasing to the temperature threshold (dashed line 811) due to the gas transfer mode heating exhaust gases, as compared to the potential catalyst temperature (dashed plot 810) that decreases to the temperature threshold by time t6 due to cool air pumping through the engine.

At time t6, the fuel shut-off event ends, as indicated by the pedal position (plot 802) and RPM (plot 804) plateauing. The decrease in vehicle speed (plot 806) may be as a result of road conditions (e.g., the vehicle is traveling uphill). As a result of a desire for combustion, the TJI system mode (plot 812) changes from the gas transfer mode to the ignition mode, the pre-chamber injector becomes active (plot 814), and the valve position (plot 816) changes from closed to open. Since the gas transfer mode maintained the catalyst temperature (plot 808) above the temperature threshold, the emission from combustion may be effectively treated.

In this way, a TJI system may be used for ignition and for increasing the efficiency of a catalyst after a fuel shut-off event occurs. For example, the TJI system may be used to recirculate gases while a fuel shut-off condition is present by opening pre-chamber injectors at advantageous times within a four stroke engine cycle. For example, opening a pre-chamber injector when a cylinder fluidically coupled to the pre-chamber injector within the mid to late compression stroke allows for gases compressed by a piston in the cylinder to exit the cylinder through the pre-chamber injector and into a rail that connects to other pre-chamber injectors. The hot, compressed gases within the common delivery passage may then flow into a cylinder within the intake stroke, late expansion and/or exhaust stroke, or both. Transferring hot gases from a cylinder in the compression stroke to a cylinder in the exhaust stroke increases the temperature of exhaust gases entering an exhaust manifold and passing through the catalyst. The increased temperature of exhaust gases may decrease the amount the catalyst cools during the fuel shut-off event, maintaining the catalyst above its light-off temperature such that when combustion is resumed the catalyst will be at a high enough temperature to react and treat emissions from the engine. Transferring hot gases from a cylinder in the compression stroke to a cylinder in the intake stroke increase the temperature of intake air entering the cylinder, and by recirculating the gases the amount of oxygen inducted by the engine is decreased. Increasing the intake air temperature results in the exhaust gas temperature increasing, decreasing the amount the catalyst may cool. Decreasing the amount of oxygen inducted by the engine decreases the amount of oxygen reaching the catalyst, decreasing the oxygen saturation of the catalyst.

Thus, when combustion is resumed, the catalyst may efficiently treat emissions from the engine.

FIGS. 1-2C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The technical effect of transferring gas between cylinders during a fuel shut-off event is increasing an efficiency of an emission treatment system.

The disclosure also provides support for a method for an engine, comprising: during deactivated fuel injection to a first and second cylinders of the engine, opening a first pre-chamber injector of the first cylinder undergoing late compression or early expansion and opening a second pre-chamber injector of the second cylinder undergoing late expansion or exhaust stroke to allow a hot compressed gas from the first cylinder to transfer to the second cylinder through a rail coupling the first and second pre-chamber injectors. In a first example of the method, the first and second pre-chamber injectors are gaseous injectors. In a second example of the method, optionally including the first example, the first cylinder includes a first liquid fuel injector, and the second cylinder includes a second liquid fuel injector separate from the first and second pre-chamber injectors. In a third example of the method, optionally including one or both of the first and second examples, the rail is coupled to a pump or compressor, and where a liquid fuel injector is coupled to the rail. In a fourth example of the method, optionally including one or more or each of the first through third examples, a first pre-chamber spark plug of the first cylinder is disabled during the deactivated fuel injection of the first and second cylinders. In a fifth example of the method, optionally including one or more or each of the first through fourth examples, the method further comprises: performing the transfer of hot compressed gas in response to exhaust temperature. In a sixth example of the method, optionally including one or more or each of the first through fifth examples, the method further comprises: during activated fuel injection to the first and second cylinders of the engine, injecting fuel into the first and second cylinders based on an air charge and air-fuel ratio and combusting the injected fuel with a spark plug. In a seventh example of the method, optionally including one or more or each of the first through sixth examples, the method further comprises: injecting fuel into the rail via a liquid fuel injector to create an air-fuel mixture in the rail. In an eighth example of the method, optionally including one or more or each of the first through seventh examples, the method further comprises: injecting the air-fuel mixture from the rail into a first pre-chamber via the first pre-chamber injector during a compression stroke of the first cylinder and actuating a first pre-chamber spark plug after injecting the air-fuel mixture, and injecting the air-fuel mixture from the rail into a second pre-chamber via the second pre-chamber injector during a compression stroke of the second cylinder and actuating a second pre-chamber spark plug after injecting the air-fuel mixture. In a ninth example of the method, optionally including one or more or each of the first through eighth examples, the method further comprises: exhausting the hot, compressed gases from the second cylinder through one or more open exhaust valves. In a tenth example of the method, optionally including one or more or each of the first through ninth examples, the method further comprises: adjusting a timing of exhaust valves in response to a desired exhaust temperature. In a eleventh example of the method, optionally including one or more or each of the first through tenth examples, opening of the first and second pre-chamber injectors overlap at least partially. In a twelfth example of the method, optionally including one or more or each of the first through eleventh examples, opening of the first and second pre-chamber injectors only partially overlap. In a thirteenth example of the method, optionally including one or more or each of the first through twelfth examples, opening of the first and second pre-chamber injectors do not overlap.

The disclosure also provides support for a system, comprising: an engine having a first and second cylinder, each with a pre-chamber, a fuel injector coupled in each of the first and second cylinders, a gaseous injector coupled in each of the pre-chambers, the gaseous injectors coupled via a rail receiving pressured air and fuel injected from a supply injector coupled to the rail, the rail further having a valve, a spark plug coupled in each of the pre-chambers, and a controller configured to deactivate the fuel injectors and not combust any air and fuel in each of the first and second cylinders, open a first pre-chamber gaseous injector of the first cylinder undergoing late compression or early expansion, open a second pre-chamber injector of the second cylinder undergoing late expansion or exhaust stroke or intake stroke, and close the valve in the rail. In a first example of the system, the controller is further configured to deactivate the fuel injectors and not combust fuel in the first and second cylinders in response to an accelerator pedal not being depressed, a brake pedal being depressed, a tip-out event occurring, and/or a decreased amount of torque demand. In a second example of the system, optionally including the first example, the controller is further configured to activate the deactivated fuel injectors and combust fuel in the first and second cylinders in response to an acceleration pedal increasing in being depressed and/or an increased amount of torque demand, and, while the fuel injectors are activated, the controller is further configured to enable a pre-chamber fuel supply coupled to the rail, inject air and fuel into the pre-chamber, open or maintain open the valve, and actuate a pre-chamber spark plug at a desired timing.

The disclosure also provides support for a method for an engine, comprising: during a first mode: during deactivated fuel injection to a first and second cylinders of the engine, opening a first pre-chamber injector of the first cylinder undergoing late compression or early expansion and opening a second pre-chamber injector of the second cylinder to allow a hot compressed gas from the first cylinder to transfer to the second cylinder through a rail coupling the first and second pre-chamber injectors, and during a second mode: during activated fuel injection to cylinders of the engine, determining a desired air-fuel ratio (AFR) and injecting fuel into the cylinders based on cylinder air charge and the desired AFR, activating a pre-chamber fuel injector to inject fuel into the rail, injecting an air-fuel mixture from the rail into the pre-chambers via pre-chamber injectors and actuating a pre-chamber spark plug for ignition within the pre-chamber. In a first example of the method, during the first mode the second cylinder is undergoing a late expansion or exhaust stroke when the second pre-chamber injector is opened. In a second example of the method, optionally including the first example, during the first mode the second cylinder is undergoing an intake stroke when the second pre-chamber injector is opened.

In another representation, a method for an engine, comprising: during deactivated fuel injection to a first and second cylinders of the engine, opening a first pre-chamber injector of the first cylinder a first pressure and opening a second pre-chamber injector of the second cylinder a second pressure to allow a hot compressed gas from the first cylinder to transfer to the second cylinder through a rail coupling the first and second pre-chamber injectors. In the previous example, additionally or optionally, the first pressure is a higher pressure than the second pressure.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
during deactivated fuel injection to a first and second cylinders of the engine, opening a first pre-chamber injector of the first cylinder undergoing late compression or early expansion and opening a second pre-chamber injector of the second cylinder undergoing late expansion or exhaust stroke to allow a hot compressed gas from the first cylinder to transfer to the second cylinder through a rail coupling the first and second pre-chamber injectors.

2. The method of claim 1, wherein the first and second pre-chamber injectors are gaseous injectors.

3. The method of claim 1, wherein the first cylinder includes a first liquid fuel injector, and the second cylinder includes a second liquid fuel injector separate from the first and second pre-chamber injectors.

4. The method of claim 1, wherein the rail is coupled to a pump or compressor, and where a liquid fuel injector is coupled to the rail.

5. The method of claim 1, wherein a first pre-chamber spark plug of the first cylinder is disabled during the deactivated fuel injection of the first and second cylinders.

6. The method of claim 1 further comprising performing the transfer of hot compressed gas in response to exhaust temperature.

7. The method of claim 1 further comprising during activated fuel injection to the first and second cylinders of the engine, injecting fuel into the first and second cylinders based on an air charge and air-fuel ratio and combusting the injected fuel with a spark plug.

8. The method of claim 7 further comprising injecting fuel into the rail via a liquid fuel injector to create an air-fuel mixture in the rail.

9. The method of claim 8 further comprising:
injecting the air-fuel mixture from the rail into a first pre-chamber via the first pre-chamber injector during a compression stroke of the first cylinder and actuating a first pre-chamber spark plug after injecting the air-fuel mixture; and injecting the air-fuel mixture from the rail into a second pre-chamber via the second pre-chamber injector during a compression stroke of the second cylinder and actuating a second pre-chamber spark plug after injecting the air-fuel mixture.

10. The method of claim 1 further comprising exhausting the hot, compressed gases from the second cylinder through one or more open exhaust valves.

11. The method of claim 10 further comprising adjusting a timing of exhaust valves in response to a desired exhaust temperature.

12. The method of claim 1 wherein opening of the first and second pre-chamber injectors overlap at least partially.

13. The method of claim 1 wherein opening of the first and second pre-chamber injectors only partially overlap.

14. The method of claim 1 wherein opening of the first and second pre-chamber injectors do not overlap.

15. A system, comprising:
- an engine having a first and second cylinder, each with a pre-chamber;
- a fuel injector coupled in each of the first and second cylinders;
- a gaseous injector coupled in each of the pre-chambers, the gaseous injectors coupled via a rail receiving pressured air and fuel injected from a supply injector coupled to the rail, the rail further having a valve;
- a spark plug coupled in each of the pre-chambers; and
- a controller configured to deactivate the fuel injectors and not combust any air and fuel in each of the first and second cylinders, open a first pre-chamber gaseous injector of the first cylinder undergoing late compression or early expansion; open a second pre-chamber injector of the second cylinder undergoing late expansion or exhaust stroke or intake stroke; and close the valve in the rail.

16. The system of claim 15, wherein the controller is further configured to deactivate the fuel injectors and not combust fuel in the first and second cylinders in response to an accelerator pedal not being depressed, a brake pedal being depressed, a tip-out event occurring, and/or an decreased amount of torque demand.

17. The system of claim 15, wherein the controller is further configured to activate the deactivated fuel injectors and combust fuel in the first and second cylinders in response to an acceleration pedal increasing in being depressed and/or an increased amount of torque demand, and, while the fuel injectors are activated, the controller is further configured to enable a pre-chamber fuel supply coupled to the rail, inject air and fuel into the pre-chamber, open or maintain open the valve, and actuate a pre-chamber spark plug at a desired timing.

18. A method for an engine, comprising:
- during a first mode: during deactivated fuel injection to a first and second cylinders of the engine, opening a first pre-chamber injector of the first cylinder undergoing late compression or early expansion and opening a second pre-chamber injector of the second cylinder to allow a hot compressed gas from the first cylinder to transfer to the second cylinder through a rail coupling the first and second pre-chamber injectors; and
- during a second mode: during activated fuel injection to cylinders of the engine, determining a desired air-fuel ratio (AFR) and injecting fuel into the cylinders based on cylinder air charge and the desired AFR, activating a pre-chamber fuel injector to inject fuel into the rail, injecting an air-fuel mixture from the rail into the pre-chambers via pre-chamber injectors and actuating a pre-chamber spark plug for ignition within the pre-chamber.

19. The method of claim 18, wherein during the first mode the second cylinder is undergoing a late expansion or exhaust stroke when the second pre-chamber injector is opened.

20. The method of claim 18, wherein during the first mode the second cylinder is undergoing an intake stroke when the second pre-chamber injector is opened.

* * * * *